US012767753B2

(12) United States Patent
Deng et al.

(10) Patent No.: US 12,767,753 B2
(45) Date of Patent: Oct. 20, 2026

(54) SEQUENCE-BLOCK COPOLYMERS AND PREPARATION THEREFOR AND APPLICATION THEREOF

(71) Applicant: Canton Litho Material Technology Inc., Guangzhou (CN)

(72) Inventors: Hai Deng, Guangzhou (CN); Min Cao, Guangzhou (CN)

(73) Assignee: CANTON LITHO MATERIAL TECHNOLOGY INC., Guangzhou (CN)

( * ) Notice: Subject to any disclaimer, the term of this patent is extended or adjusted under 35 U.S.C. 154(b) by 1036 days.

(21) Appl. No.: 17/744,077

(22) Filed: May 13, 2022

(65) Prior Publication Data

US 2022/0380511 A1 Dec. 1, 2022

Related U.S. Application Data

(60) Provisional application No. 63/188,158, filed on May 13, 2021.

(51) Int. Cl.

| | |
|---|---|
| ***C08F 20/20*** | (2006.01) |
| ***C08F 16/32*** | (2006.01) |
| ***C08F 30/08*** | (2006.01) |
| ***C08F 293/00*** | (2006.01) |

(52) U.S. Cl.

CPC .......... *C08F 293/005* (2013.01); *C08F 16/32* (2013.01); *C08F 20/20* (2013.01); *C08F 30/08* (2013.01)

(58) Field of Classification Search

None

See application file for complete search history.

(56) References Cited

FOREIGN PATENT DOCUMENTS

CN 109929070 A * 6/2019

OTHER PUBLICATIONS

Terashima, T. et al. "Polymeric pseudo-crown ether for cation recognition via cation template-assisted cyclopolymerization." Nature Communications 2013, 4, 2321. (Year: 2013).*

* cited by examiner

*Primary Examiner* — Richard A. Huhn

(74) *Attorney, Agent, or Firm* — NKL Law; Bin Lu; Allen Xue

(57) ABSTRACT

Sequence-block copolymers have well-controlled and precise monomer sequence. A highly ordered fluoro-containing block copolymer material can be prepared based on the sequence-block copolymer, which shows excellent patterning capability.

4 Claims, 8 Drawing Sheets

SEQUENCE-BLOCK COPOLYMERS AND PREPARATION THEREFOR AND APPLICATION THEREOF

This application claims the benefit of priority under 35 U.S.C § 119(e) to U.S. Provisional Application Ser. No. 63/188,158 filed May 13, 2021, the disclosure is incorporated herein by reference in its entirety.

TECHNICAL FIELD

This invention relates to a new kind of copolymers composed of several segments of defined monomer sequences, so-called "sequence-block" copolymers and their preparation and application methods.

BACKGROUND

It is well known that monomer sequence control in copolymers is critical to determining the final material properties. For example, chemically amplified ArF and EUV photoresists are composed of three to five monomers, whose sequency is considered as key factor to determine the photoresist performance, such as resolution, photospeed and roughness.

Although the monomer sequence in copolymers is highly important, it still remains unknown how to control sequence of polar monomers as well as polar-nonpolar comonomers.

Unlike the well-conducted random copolymerization of various polar monomers, random copolymerization of comonomers with intrinsic largely different reactivities, e.g., polar monomer with nonpolar monomer remains a huge challenge to all polymer chemists.

Such unrealized random copolymers as completely new materials are expected to yield extra-high performance superior to the existing block or graft copolymers.

Take the copolymerization of methacrylate and olefin as an example, olefin polymers are manufactured using Ziegler-Natta catalyst, which is however difficult to polymerize methacrylate monomers due to the poisoning effect on the metal catalysts. By employing late transition metal (Pd, Ni) catalysts, less than 5% MMA monomer was randomly incorporated into polyolefin, however normally is considered as rather than a true random copolymer of MMA and olefin. On the other hand, the PMMA manufacturing normally employs free radical polymerization, which is extremely difficult to copolymerize the inert olefin monomers with almost zero reactivity ratio against MMA. Random copolymerization of MMA and olefins assisted by Lewis acids was reported, which could decrease the electron density of MMA to match the electron-rich olefin.

Moreover, if we define random copolymerization of comonomers with hugely different reactivities into the same polymer chain as ground level challenge, then controlling the monomer sequence along the polymer backbone could be the much higher-level challenge that requires extremely precise control of monomer insertion. In this invention, a new copolymer family like the reported stereo-block copolymer, so-called "sequence-block copolymer" containing several segments of varied monomer sequences was synthesized and characterized. Each sequenced block (segment) has defined monomer sequence and degree of polymerization.

SUMMARY OF THE INVENTION

This invention is intended for providing a new sequence-block copolymer with excellent patterning capability and its preparation and application methods.

In the first aspect of the present invention, it provides a sequence-block binary copolymer, wherein the main chain of the copolymer is consisting of sequence-block X, and the sequence-block X has a structure shown in formula (1):

$$-[(AAA)_m-(AB)_n]_p- \quad (1)$$

wherein, (AAA) is a homopolymeric segment of monomer A, which is formed by the homopolymerization of three monomers A;

m is selected from the group consisting of 1, 2, 3, 4, 5, 6, 7, 8, 9, and 10;

(AB) is a copolymerized segment of monomer A and monomer B, which is formed by copolymerization of one monomer A and one monomer B;

n is selected from the group consisting of 1, 2, 3, 4, 5, 6, 7, 8, 9, and 10;

p is selected from the group consisting of 1, 2, 3, 4, 5, 6, 7, 8, 9, and 10.

In another preferred embodiment, the monomer A and the monomer B have the following characteristics: under polymerization conditions, the reaction activity of monomer A and that of monomer B are very different;

the "the reaction activity of monomer A and that of monomer B are very different" means that monomer B is almost inactive, so it cannot be initiated to form a growth reactive species, and only a cyclic secondary monomer (AB) formed by monomer A and monomer B through cyclization reaction can enter the main chain of the copolymer; monomer A can be homopolymerized to form a homopolymeric segment (AAA) of monomer A to enter the main chain of the copolymer; then, (AAA) and (AB) together form the structure shown in formula (1).

In another preferred embodiment, under free radical polymerization conditions, the monomer A is a polar monomer, and the monomer B is a non-polar monomer.

In another preferred embodiment, in (AAA), the monomer A is polymerized to form a

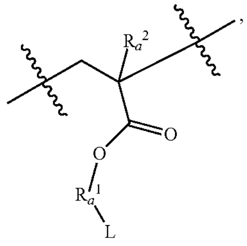

, and

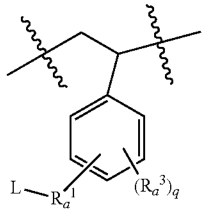

;

structure selected from the group consisting of L, and Ra;

wherein, each $R_a^1$ is independently selected from the group consisting of C1-C6 alkylene, C3-C8 cycloalkylene, C5-C10 arylene, and —(C5-C10 arylene)—(C1-C6 alkylene)-; each $R_a^2$ is independently selected from the group consisting of H, C1-C6 alkyl and halogenated C1-C6 alkyl;

each L is independently selected from the group consisting of —OH, —COOH, —$OCOR_1$, —$OR_1$, —$OSiR_1R_2$, —OZrR1$R_2$, —$OBR_1$, and —$L_1$—$L_2$—R';

each $R_1$ and $R_2$ are independently selected from the group consisting of C1-C6 alkyl, C3-C8 cycloalkyl, C5-C10 aryl, and C5-C10 aryl-C1-C6 alkylene-;

each —$L_1$-$L_2$—is independently selected from the group consisting of

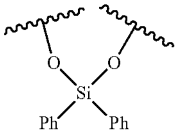,
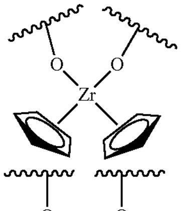,
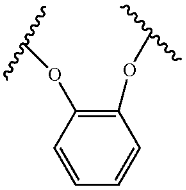
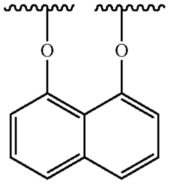
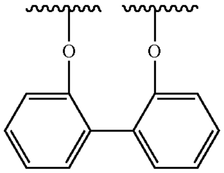
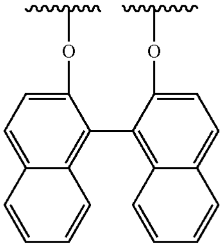;

each R' is independently selected from the group consisting of C2-C6 alkenyl, —$R_a^1$—O—C2-C6 alkenyl, and

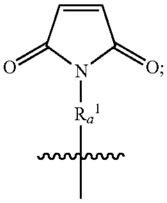;

each $R_a^3$ is independently selected from the group consisting of H, halogenated or unsubstituted C1-C15 linear or branched alkyl, and substituted or unsubstituted C1-C15 linear or branched alkoxy; the substituted refers to being substituted by one or more substituents selected from the group consisting of halogen, hydroxyl, carbonyl, amino, and amide;

q is selected from the group consisting of 1, 2, 3, 4, and 5.

In another preferred embodiment, each $R_a^1$ is independently C1-C6 alkylene;

each $R_a^2$ is independently selected from the group consisting of H, and C1-C6 alkyl;

each L is independently selected from the group consisting of —OH, and —$L_1$-$L_2$-R';

each -$L_1$-$L_2$- is independently selected from the group consisting of

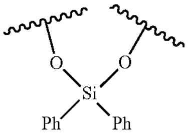,
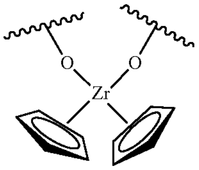,
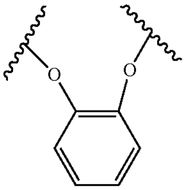
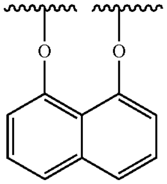
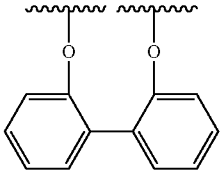
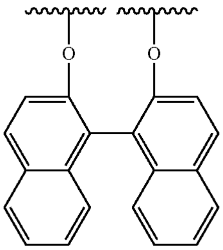;

each R' is independently selected from the group consisting of C2-C6 alkenyl; each $R_a^3$ is independently selected from the group consisting of H, halogenated or unsubstituted C1-C6 alkyl, and substituted or unsubstituted C1-C6 alkoxy; the substituted refers to being substituted by one or more substituents selected from the group consisting of halogen, hydroxyl, carbonyl, amino, and amide;

q is selected from the group consisting of 1, 2, 3, 4, and 5.

In another preferred embodiment, each $R_a^1$ is independently C1-C6 alkylene; each $R_a^2$ is independently selected from the group consisting of H, and C1-C6 alkyl; each L is independently selected from the group consisting of —OH, and —$L_1$-$L_2$-R';

-$L_1$-$L_2$- is

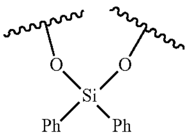;

each R' is independently C2-C6 alkenyl;

$R_a^3$ is selected from the group consisting of H, halogenated or unsubstituted C1-C3 alkyl, and substituted or unsubstituted C1-C3 alkoxy; the substituted refers to being substituted by one or more substituents selected from the group consisting of halogen, hydroxyl, and amino;

q is selected from the group consisting of 1, 2, 3, 4, and 5.

In another preferred embodiment, in (AB), the monomer A and the monomer B are polymerized to form a cyclic structure selected from the group consisting of $L/L_1$

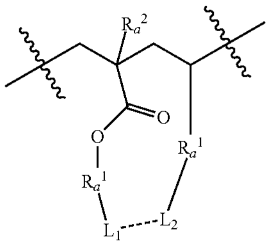

,

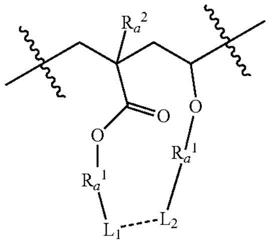

,

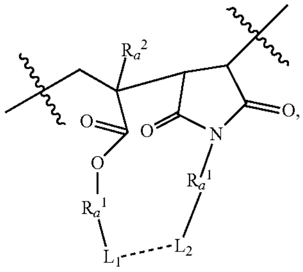

,

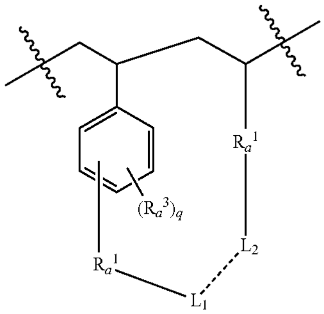

,

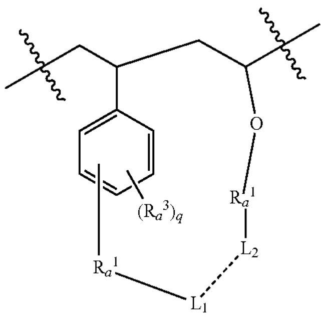

, and

-continued

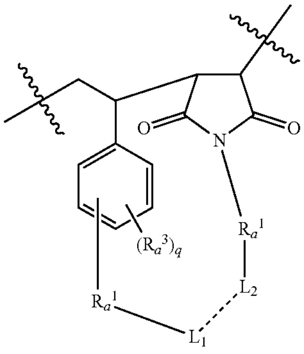

;

or, the monomer A is polymerized to form a structure selected from the group consisting of

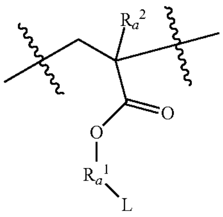

, and

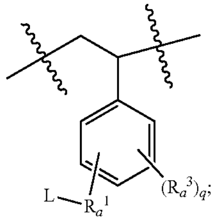

;

the monomer B is polymerized to form a structure selected from the group consisting of

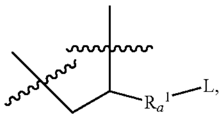

,

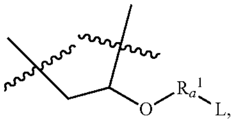

, and

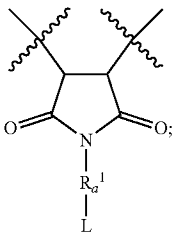

;

wherein, each $R_a^1$ is independently selected from the group consisting of C1-C6 alkylene, C3-C8 cycloalkylene, C5-C10 arylene, and —(C5-C10 arylene)—(C1-C6 alkylene)—;

each $R_a^2$ is independently selected from the group consisting of H, C1-C6 alkyl and halogenated C1-C6 alkyl;

each $-L_1-L_2-$ is independently selected from the group consisting of

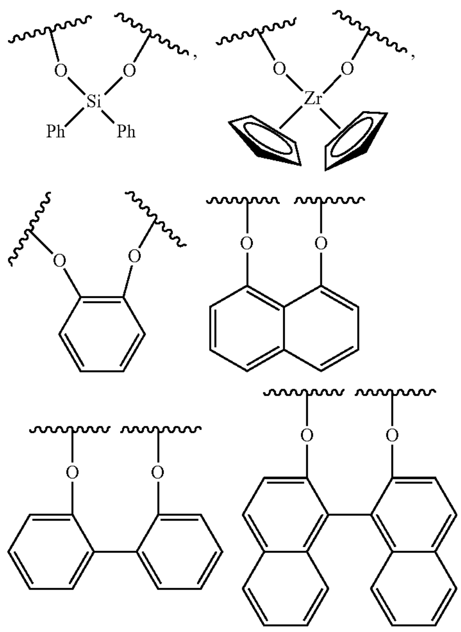

;

each $R_a^3$ is independently selected from the group consisting of H, halogenated or 5 unsubstituted C1-C15 linear or branched alkyl, and substituted or unsubstituted C1-C15 linear or branched alkoxy; the substituted refers to being substituted by one or more substituents selected from the group consisting of halogen, hydroxyl, carbonyl, amino, and amide;

q is selected from the group consisting of 1, 2, 3, 4, and 5;

L is hydroxyl.

In another preferred embodiment, in (AB), the monomer A and the monomer B are polymerized to form a cyclic structure selected from the group consisting of

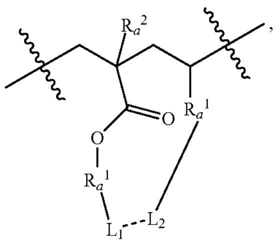

, and

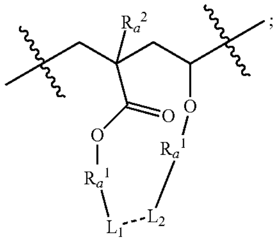

;

or, the monomer A is polymerized to form the following structure: L

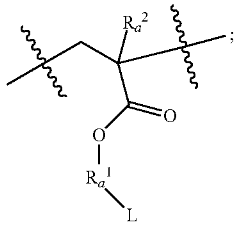

;

the monomer B is polymerized to form a structure selected from the group consisting of

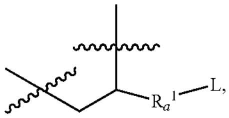

and

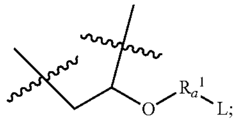

;

wherein, each $R_a^1$ is independently selected from C1-C6 alkylene;

each $R_a^2$ is independently selected from the group consisting of H, and C1-C6 alkyl;

each $-L_1-L_2-$ is independently selected from the group consisting of

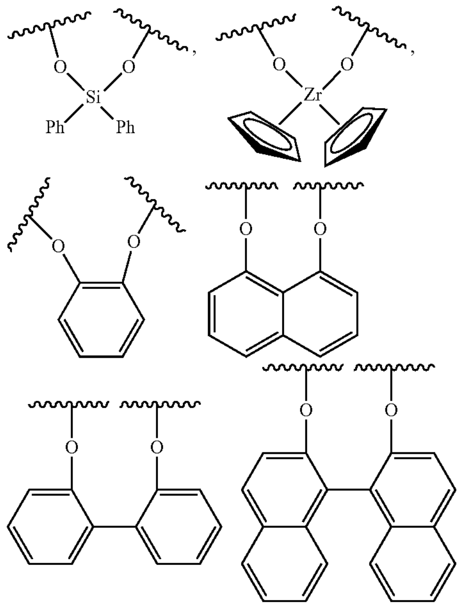

;

each $R_a^3$ is independently selected from the group consisting of H, halogenated or unsubstituted C1-C6 alkyl, and substituted or unsubstituted C1-C6 alkoxy; the substituted refers to being substituted by one or more substituents selected from the group consisting of halogen, hydroxyl, carbonyl, amino, and amide;

q is selected from the group consisting of 1, 2, 3, 4, and 5;

L is hydroxyl.

In another preferred embodiment, in (AB), the monomer A and the monomer B are polymerized to form the following cyclic structure: ;

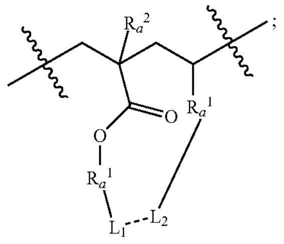

or, the monomer A is polymerized to form the following structure:

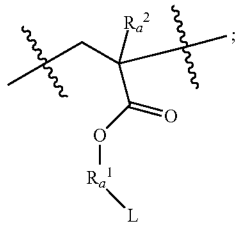

the monomer B is polymerized to form a structure selected from the group consisting

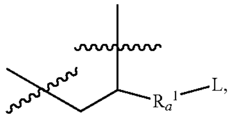

and

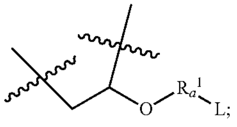

wherein, each $R_a^1$ is independently selected from C1-C6 alkylene;

each $R_a^2$ is independently selected from the group consisting of H, and C1-C6 alkyl;

$-L_1-L_2-$ is

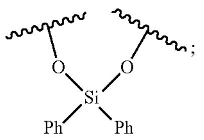 [SMILES: *O[Si](O*)(c1ccccc1)c1ccccc1]

each $R_a^3$ is independently selected from the group consisting of H, halogenated or unsubstituted C1-C3 alkyl, and substituted or unsubstituted C1-C3 alkoxy; the substituted refers to being substituted by one or more substituents selected from the group consisting of halogen, hydroxyl, and amino;

q is selected from the group consisting of 1, 2, 3, 4, and 5;

L is hydroxyl.

In another preferred embodiment, the sequence-block binary copolymer has one or more characteristics selected from the group consisting of:

1) the sequence-block binary copolymer has a molecular weight of 20000-60000, preferably 25000-50000, more preferably 30000-40000;

2) the sequence-block binary copolymer has a PDI of 5-8, preferably 6-7, more preferably 6.2-6.6;

3) m:n is 1-3, preferably 1.2-2, more preferably 1.4-1.8.

In another preferred embodiment, the copolymer is selected from the group consisting of

P1

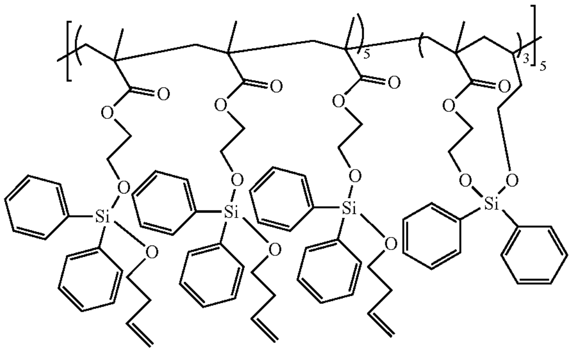

P1'

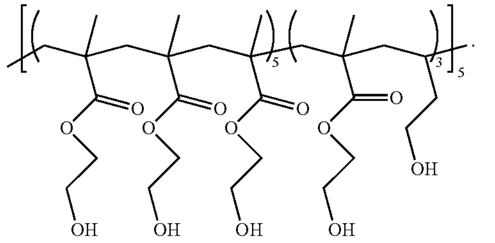

In the second aspect of the present invention, it provides a highly ordered fluorine-5 containing polymer material, wherein the fluorine-containing polymer material comprises a block copolymer, and the block copolymer comprises the sequence-block X having a structure shown in formula (1) according to the first aspect of the present invention and block Y;

the block Y has the following structure:

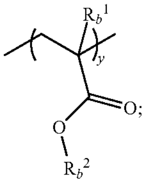

wherein, $R_b^1$ is selected from the group consisting of H, C1-C6 alkyl, and halogenated C1-C6 alkyl;

$R_b^2$ is a fluorine-containing group;

y is selected from the group consisting of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

In another preferred embodiment, y:p is 3-15, preferably 5-10, more preferably 6-8.

In another preferred embodiment, $R_b^2$ is F-substituted C1-C10 alkyl.

In another preferred embodiment, $R_b^2$ is F-substituted C1-C6 alkyl, preferably F-substituted C1-C4 alkyl.

In another preferred embodiment, in $R_b^2$, 50-100% of H is substituted by F, preferably 60-100%, more preferably 70-100%.

In another preferred embodiment, $R_b^2$ is perfluorinated C1-C10 alkyl, preferably perfluorinated C1-C6 alkyl, and more preferably perfluorinated C1-C4 alkyl.

In another preferred embodiment, $R_b^2$ is C4H2F7.

In another preferred embodiment, the block copolymer has the following structure: -block Y-block X-.

In another preferred embodiment, the fluorine-containing polymer material has one or more features selected from the group consisting of:

1) the fluorine-containing polymer material has a molecular weight of 5000-20000, preferably 7000-15000, more preferably 9000-13000;

2) the fluorine-containing polymer material has a PDI of 0.8-2, preferably 0.9-1.5, more preferably 1-1.2.

In another preferred embodiment, the block copolymer has the following structure:

B1

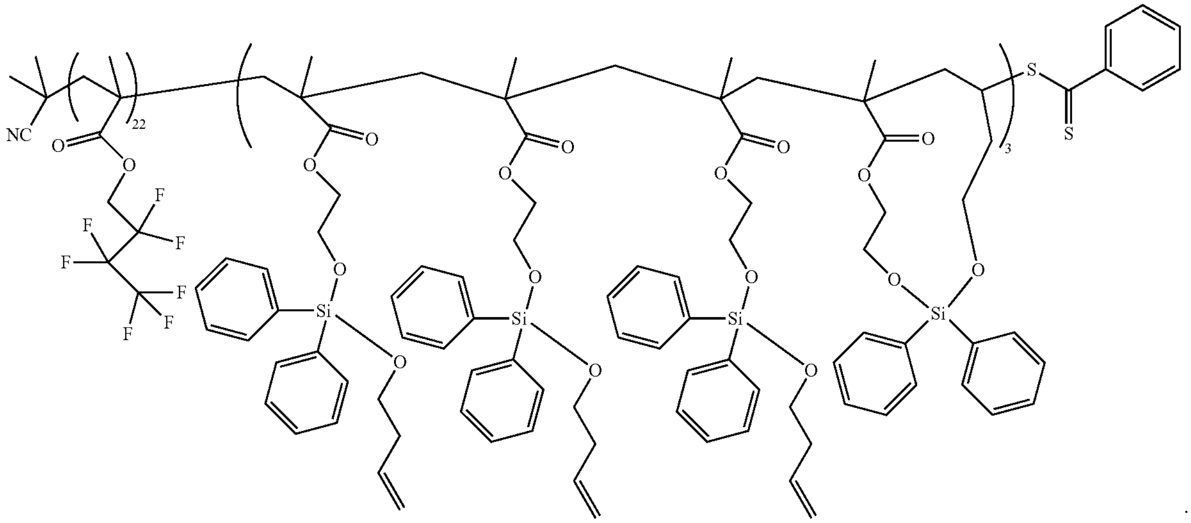

.

In the third aspect of the present invention, it provides a sequence-block terpolymer, wherein the sequence-block terpolymer is formed by copolymerization of monomer A, monomer B and monomer C;

the sequence-block terpolymer has a structure shown in formula (2):

$-[(AC)_k-(AA)_m-(AB)_m]_p-(2)$ wherein, (AC) is a copolymerized segment of monomer A and monomer C, which is formed by copolymerization of one monomer A and one monomer C;

k is selected from the group consisting of 1, 2, 3, 4, 5, 6, 7, 8, 9, and 10;

(AA) is a homopolymeric segment of monomer A, which is formed by the homopolymerization of two monomers A;

m is selected from the group consisting of 1, 2, 3, 4, 5, 6, 7, 8, 9, and 10;

(AB) is a copolymerized segment of monomer A and monomer B, which is formed by copolymerization of one monomer A and one monomer B;

n is selected from the group consisting of 1, 2, 3, 4, 5, 6, 7, 8, 9, and 10;

p is selected from the group consisting of 1, 2, 3, 4, 5, 6, 7, 8, 9, and 10.

In another preferred embodiment, in (AC) and (AA), the monomer A is polymerized to form a structure selected from the group consisting of

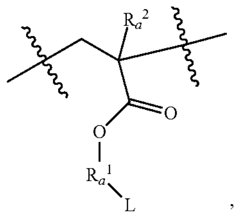

, and

-continued

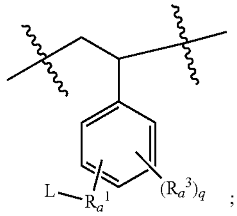

;

wherein, each $R_a^1$ is independently selected from the group consisting of C1-C6 alkylene, C3-C8 cycloalkylene, C5-C10 arylene, and —(C5-C10 arylene)-(C1-C6 alkylene)-;

each $R_a^2$ is independently selected from the group consisting of H, C1-C6 alkyl and halogenated C1-C6 alkyl;

each L is independently selected from the group consisting of —OH, —COOH, —$OCOR_1$, —$OR_1$, —$OSiR_1R_2$, —OZrR1$R_2$, —$OBR_1$, and $-L_1-L_2-R'$;

each $R_1$ and $R_2$ are independently selected from the group consisting of C1-C6 alkyl, C3-C8 cycloalkyl, C5-C10 aryl, and C5-C10 aryl-C1-C6 alkylene-;

each $-L_1-L_2-$ is independently selected from the group consisting of

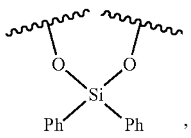,
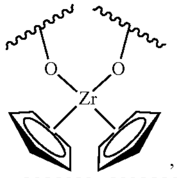,
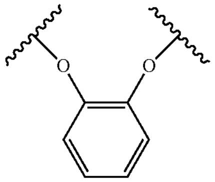
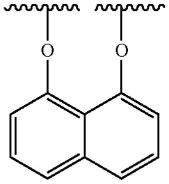
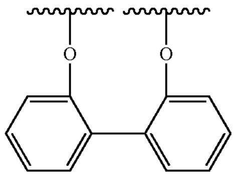
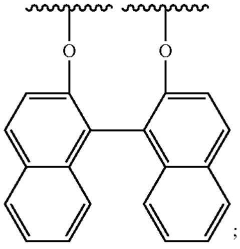;

each R' is independently selected from the group consisting of C2-C6 alkenyl, -$R_a{}^1$—O—

C2-C6 alkenyl, and

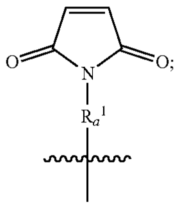

each $R_a{}^3$ is independently selected from the group consisting of H, halogenated or unsubstituted C1-C15 linear or branched alkyl, and substituted or unsubstituted C1-C15 linear or branched alkoxy; the substituted refers to being substituted by one or more substituents selected from the group consisting of halogen, hydroxyl, carbonyl, amino, and amide;

q is selected from the group consisting of 1, 2, 3, 4, and 5.

In another preferred embodiment, each $R_a{}^1$ is independently C1-C6 alkylene;

each $R_a{}^2$ is independently selected from the group consisting of H, and C1-C6 alkyl;

each L is independently selected from the group consisting of —OH, and -$L_1$-$L_2$-R'; each -$L_1$-$L_2$- is independently selected from the group consisting of

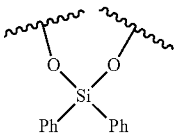,
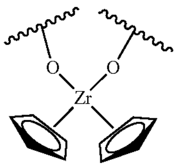,

-continued

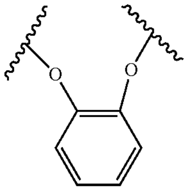
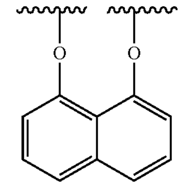
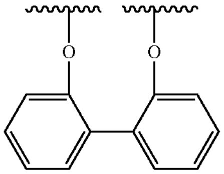
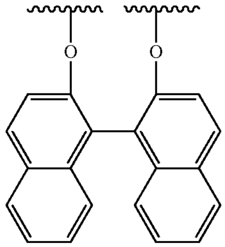;

each R' is independently selected from C2-C6 alkenyl;

each $R_a{}^3$ is independently selected from the group consisting of H, halogenated or unsubstituted C1-C6 alkyl, and substituted or unsubstituted C1-C6 alkoxy; the substituted refers to being substituted by one or more substituents selected from the group consisting of halogen, hydroxyl, carbonyl, amino, and amide;

q is selected from the group consisting of 1, 2, 3, 4, and 5.

In another preferred embodiment, each $R_a{}^1$ is independently C1-C6 alkylene;

each $R_a{}^2$ is independently selected from the group consisting of H, and C1-C6 alkyl;

each L is independently selected from the group consisting of —OH, and -$L_1$-$L_2$-R'; -$L_1$-$L_2$- is

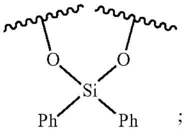;

each R' is independently C2-C6 alkenyl;

$R_a{}^3$ is selected from the group consisting of H, halogenated or unsubstituted C1-C3 alkyl, and substituted or unsubstituted C1-C3 alkoxy; the substituted refers to being substituted by one or more substituents selected from the group consisting of halogen, hydroxyl, and amino;

q is selected from the group consisting of 1, 2, 3, 4, and 5.

In another preferred embodiment, in (AC), the monomer C is selected from the group consisting of

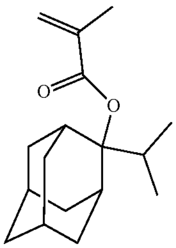,
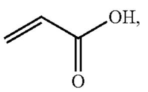
and

-continued

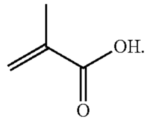

In another preferred embodiment, in (AB), the monomer A and the monomer B are polymerized to form a cyclic structure selected from the group consisting of

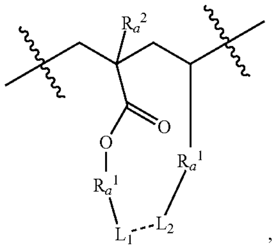
,
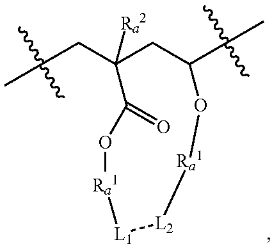
,
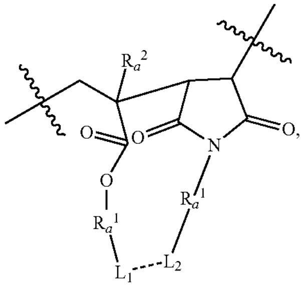
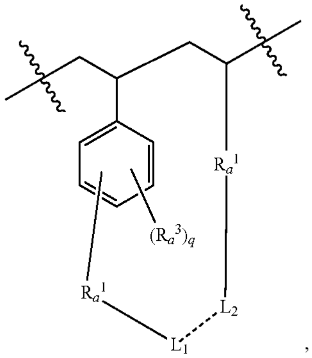
,
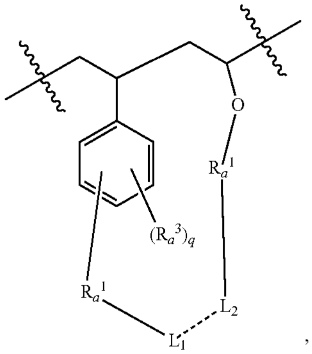
, and

-continued

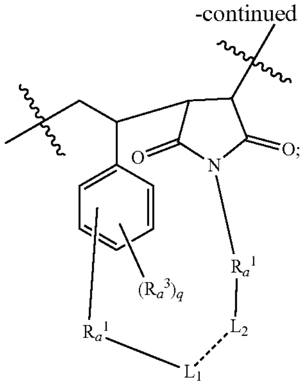

or, the monomer A is polymerized to form a structure selected from the group consisting of

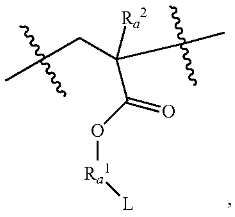
, and
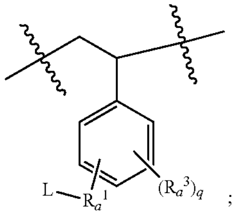
;

the monomer B is polymerized to form a structure selected from the group consisting of

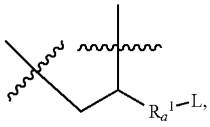
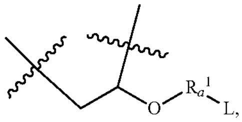
and
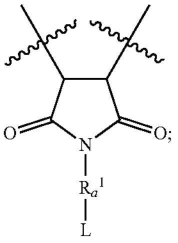

wherein, each $R_a^1$ is independently selected from the group consisting of C1-C6 alkylene, C3-C8 cycloalkylene, C5-C10 arylene, and -(C5-C10 arylene)-(C1-C6 alkylene)-;

each $R_a^2$ is independently selected from the group consisting of H, C1-C6 alkyl and halogenated C1-C6 alkyl;

each 631 $L_1$-$L_2$- is independently selected from the group consisting of

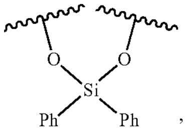 [SMILES: *O[Si](O*)(c1ccccc1)c1ccccc1],
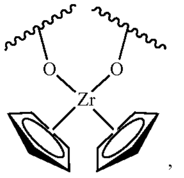,
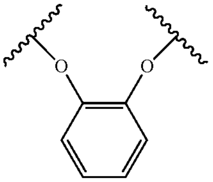
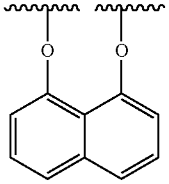
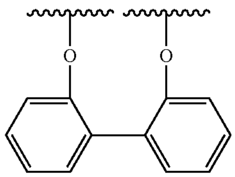
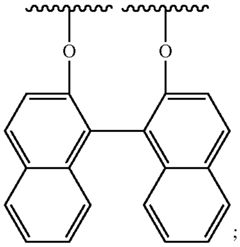;

each $R_a^3$ is independently selected from the group consisting of H, halogenated or unsubstituted C1-C15 linear or branched alkyl, and substituted or unsubstituted C1-C15 linear or branched alkoxy; the substituted refers to being substituted by one or more substituents selected from the group consisting of halogen, hydroxyl, carbonyl, amino, and amide;

q is selected from the group consisting of 1, 2, 3, 4, and 5;

L is hydroxyl.

In another preferred embodiment, in (AB), the monomer A and the monomer B are polymerized to form a cyclic structure selected from the group consisting of

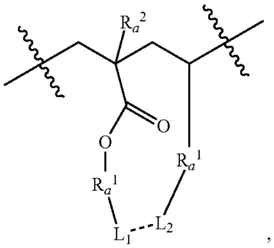
, and
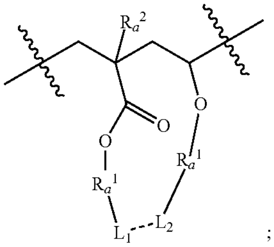
;

or, the monomer A is polymerized to form the following structure:

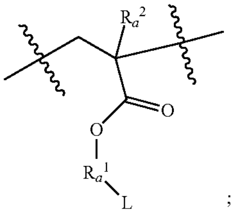
;

the monomer B is polymerized to form a structure selected from the group consisting of

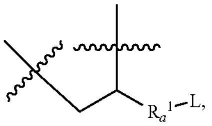
and
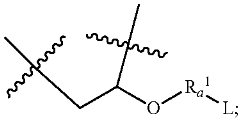

wherein, each $R_a^1$ is independently selected from C1-C6 alkylene;

each $R_a^2$ is independently selected from the group consisting of H, and C1-C6 alkyl;

each $-L_1-L_2-$ is independently selected from the group consisting of

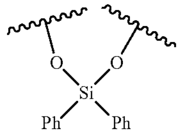,
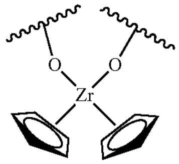,
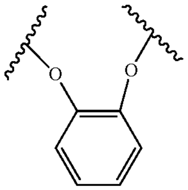
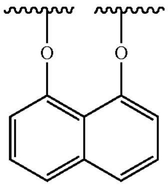
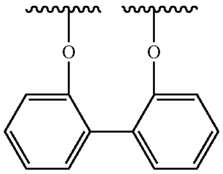
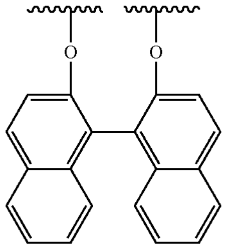;

L is hydroxyl.

In another preferred embodiment, in (AB), the monomer A and the monomer B are polymerized to form the following cyclic structure:

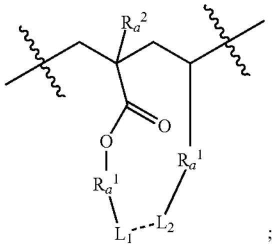
;

or, the monomer A is polymerized to form the following structure:

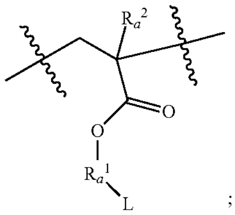
;

the monomer B is polymerized to form a structure selected from the group consisting of

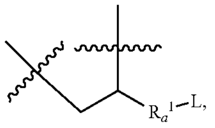
and

-continued

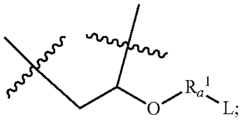

wherein, each $R_a^1$ is independently selected from C1-C6 alkylene;

each $R_a^2$ is independently selected from the group consisting of H, and C1-C6 alkyl;

$-L_1-L_2-$ is;

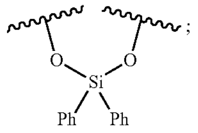 [SMILES: *O[Si](O*)(c1ccccc1)c1ccccc1]

L is hydroxyl.

In another preferred embodiment, the sequence-block terpolymer has one or more features selected from the group consisting of:

1) the sequence-block terpolymer has a molecular weight of 3000-20000, preferably 5000-15000, more preferably 7000-10000;

2) the sequence-block terpolymer has a PDI of 1.1-1.6, preferably 1.2-1.5, more preferably 1.3-1.5.

In another preferred embodiment, the sequence-block terpolymer has a structure selected from the group consisting of:

P2

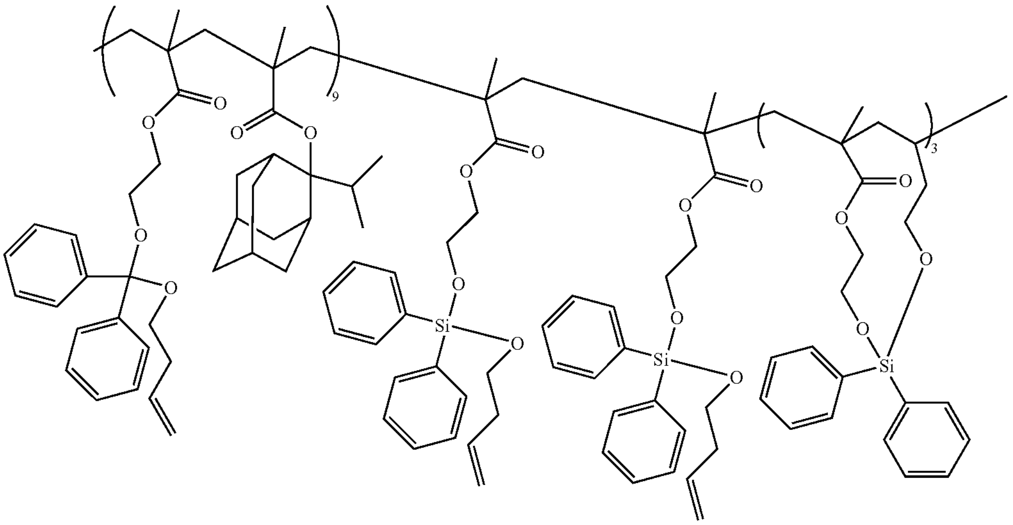

-continued

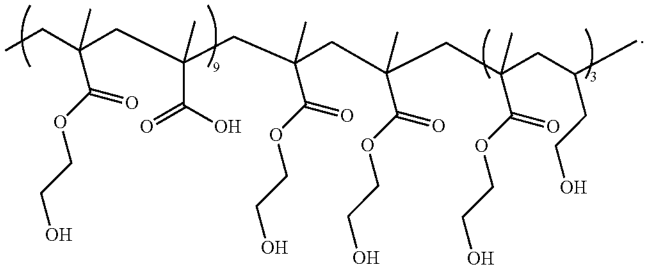

P2'

In the fourth aspect of the present invention, it provides a method for the preparation of the sequence-block binary copolymer according to the first aspect of the present invention comprising a step of:

1) providing a secondary monomer, and the secondary monomer is subjected to free radical polymerization to obtain the sequence-block binary copolymer;

the secondary monomer has a structure selected from the group consisting of

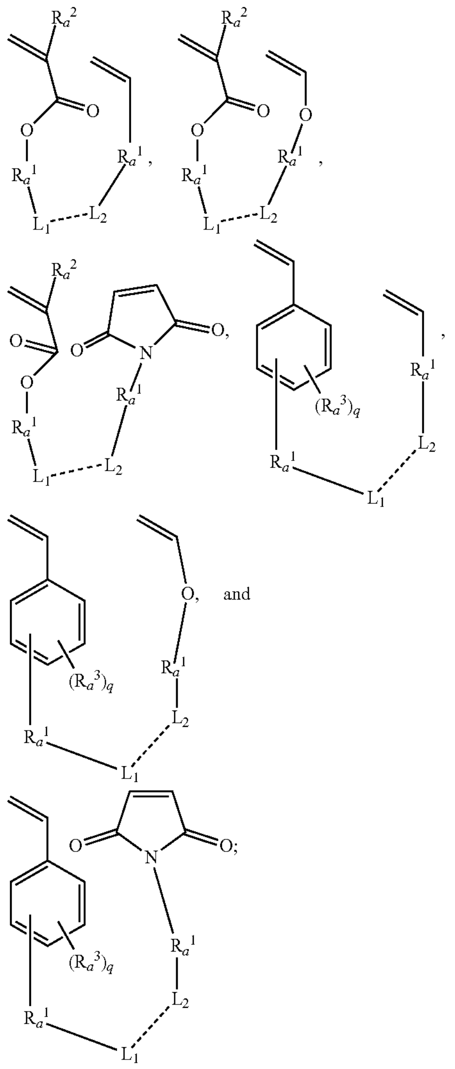

, and ;

wherein, each $R_a^1$ is independently selected from the group consisting of C1-C6 alkylene, C3-C8 cycloalkylene, C5-C10 arylene, and -(C5-C10 arylene)-(C1-C6 alkylene)-;

each $R_a^2$ is independently selected from the group consisting of H, C1-C6 alkyl and halogenated C1-C6 alkyl;

each $-L_1$-$L_2-$ is independently selected from the group consisting of

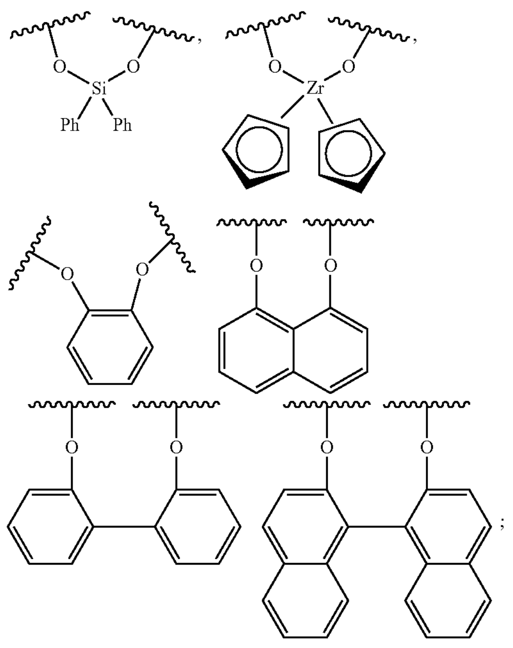

;

each $R_a^3$ is independently selected from the group consisting of H, halogenated or unsubstituted C1-C15 linear or branched alkyl, and substituted or unsubstituted C1-C15 linear or branched alkoxy; the substituted refers to being substituted by one or more substituents selected from the group consisting of halogen, hydroxyl, carbonyl, amino, and amide;

q is selected from the group consisting of 1, 2, 3, 4, and 5.

In another preferred embodiment, the secondary monomer has a structure selected from the group consisting of

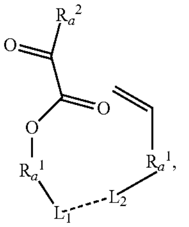

and

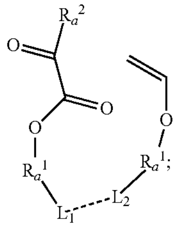

wherein, each $R_a^1$ is independently selected from the group consisting of C1-C6 alkylene, C3-C8 cycloalkylene, C5-C10 arylene, and -(C5-C10 arylene)-(C1-C6 alkylene)-;

each $R_a^2$ is independently selected from the group consisting of H, C1-C6 alkyl and halogenated C1-C6 alkyl;

each $-L_1$-$L_2-$ is independently selected from the group consisting of

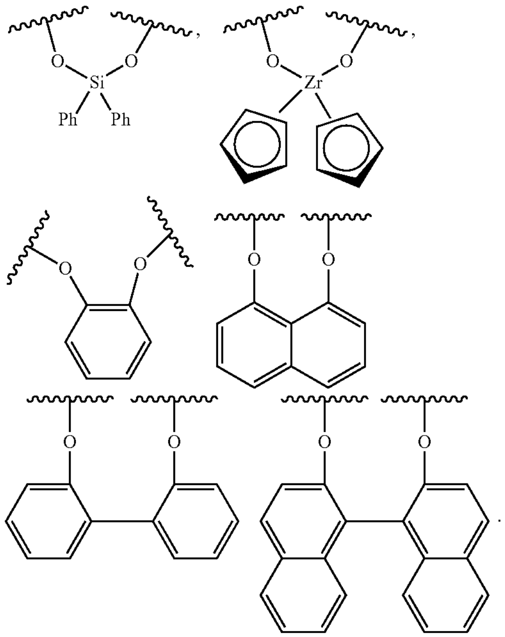

In another preferred embodiment, the method also comprises the step:

2) further hydrolyzing the sequence-block binary copolymer obtained in step 1).

In the fifth aspect of the present invention, it provides a lithographic material, wherein the lithographic material comprises one or more substances selected from the group consisting of:

1) the sequence-block binary copolymer according to the first aspect of the present invention;

2) the highly ordered fluorine-containing polymer material according to the second aspect of the present invention;

3) the sequence-block terpolymer according to the third aspect of the present invention.

It should be noted that within the scope of this invention, the technical features of the invention described above and specially described in the following (embodiments) could be combined to form a new or preferred technical solution. Due to limited space of this invention, they will not be enumerated in details herein.

FIGURES

Specific Implementation Mode

Figure 1:
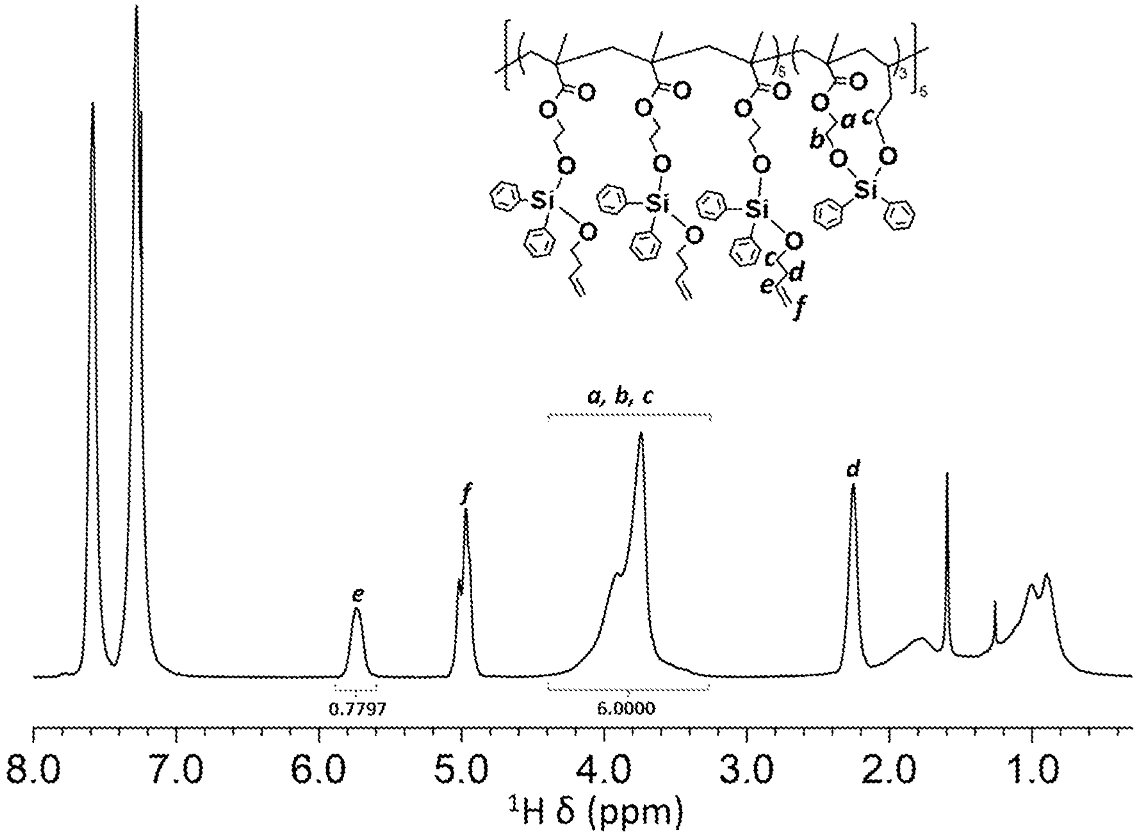
FIG. 1 shows the $^1$H NMR spectrum of the sequence-block binary copolymer P1 obtained in Embodiment 1.

Through long and in-depth study, the inventor accidentally prepared a type of new sequence-block copolymer. The described copolymer backbone contains several segments of varied monomer sequences. Each segment (sequence block) has defined monomer sequence and degree of polymerization. Such sequence-block copolymers were polymerized from the comonomer pair (monomer A and monomer B) with hugely different reactivities. Under the polymerization condition, monomer B is inert and could not generate any stable B growing species. By binding the two monomers together, B could only be inserted into the copolymer backbone via the cyclization reaction with A, while A could either intermolecularly propagate with another A to form homo-AAA sequence or intramolecularly cyclization with B to form alternating AB sequence.

By controlling the monomer concentration, the probability of A-B cyclization could be well regulated, which resulted in the homopolymer of A with B spacers, or rather, a sequence-block binary copolymer with partially alternating AB embedded in the backbone of the homopolymer of A.

A new family of block copolymer (BCP) was precisely synthesized by growing the sequence-block copolymer from a fluorine-containing macroinitiator. The isolated B unit sandwiched by A units merely acted as a carbon-carbon spacer, which did not generate additional morphology or nano domain but broke the -AAA- backbone to achieve smaller domain size. The interaction between the fluorinated block and -AAA- segment drove phase separation, forming single morphology with small and uniform domain size.

By further incorporating a non-homopolymerizable third monomer C, a sequence-block terpolymer was prepared. The incorporation of C would not influence the cyclization reaction of B, and C could only be copolymerized with A and thus be incorporated into the -AAA- segment.

The sequence-block copolymer described above has a brand-new structure with well-controlled and precise monomer sequence, which is also easily prepared. Furthermore, a new highly ordered polymer material with excellent patterning capability was constructed. On this basis, the inventor completes the invention.

Terms

In this invention, unless otherwise specified, the terms used have a general meaning known to technicians in the field.

In this invention, the term "halogen" refers to F, C1, Br, or I.

In this invention, the term "C1-C6 alkyl" refers to linear or branched alkyl containing 1-6 carbon atoms, e.g., methyl, ethyl, propyl, isopropyl, butyl, isobutyl, tert-butyl, neopentyl, tert-amyl or similar groups.

In this invention, the term "C2-C6 alkenyl" refers to linear or branched alkenyl with 2-6 carbon atoms containing one carbon-carbon double bond, including but not limited to vinyl, propylene, butenyl, isobutenyl, pentenyl, hexenyl, etc.

In this invention, the term "C2-C6 alkynyl" refers to linear or branched alkynyl with 2-6 carbon atoms containing one carbon-carbon triple bond, including but not limited to ethynyl, propargyl, butynyl, isobutynyl, pentynyl, hexynyl, etc.

In this invention, the term "C3-C8 cycloalkyl" refers to cyclic alkyl with 3-8 carbon atoms on the ring, including but not limited to cyclopropyl, cyclobutyl, cyclopentyl, cyclohexyl, cycloheptyl, cyclooctyl, etc.

In this invention, the term "C1-C6 alkoxy" refers to linear or branched alkoxy groups with 1-6 carbon atoms, including but not limited to methoxy, ethoxy, propoxy, isopropoxy, butoxy, etc. C1-C4 alkoxy is preferred.

In this invention, the term "heterocyclyl" refers to a 4-8-membered heterocyclic ring containing one, two or three heteroatoms selected from N, O, or S, including but not limited to the following groups:

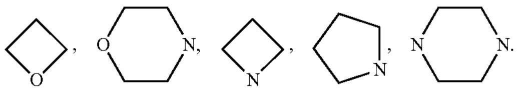

In this invention, the terms "aryl ring" or "aryl" have the same meaning, "C6-C10 aryl" is preferred. The term "C6-C10 aryl" refers to aromatic ring groups with 6-10 carbon atoms, such as phenyl, naphthalene, etc., which do not contain heteroatoms on the ring.

In this invention, the term "aromatic heterocyclic" or "heteraryl" has the same meaning and refers to a heteraryl group containing one to several heteroatoms. For example, a "C3-C10 heteraryl" is an aromatic heterocyclic ring containing one to four heteroatoms selected from oxygen, sulfur, and nitrogen, and three to ten carbon atoms, including but not limited to furyl, thienyl, pyridyl, pyrazolyl, pyrryl, n-alkyl pyrryl, pyrimidinyl, pyrazinyl, imidazolyl, tetrazolyl, etc. The aromatic heterocyclic ring can be condensed on an aryl, heterocyclyl or cycloalkyl ring, wherein the ring connected to the parent structure is a heteraryl ring. Heteraryl groups may be optionally substituted or unsubstituted.

In this invention, the term "halogenated" refers to being substituted by a halogen atom.

In this invention, the term "deuterated" refers to being substituted by a deuterium atom.

In this invention, the term "substituted" refers to the replacement of one or several hydrogen atoms in a specific group by specific substituents. Specific substituents are those described as previously mentioned or those presented in each embodiment. Unless otherwise specified, a substituted group may have a substituent selected from a particular group at any of the substitutable sites of the group, and the substituents may be the same or different at each location.

Those skilled in the field should understand that the combinations of substituents intended by the invention are stable or chemically achievable. The substituents include but are not limited to halogens, hydroxyl groups, carboxyl groups (—COOH), C1-C6 alkyl groups, C2-C6 alkenyl groups, C3-C8 cycloalkyl groups, 3-12 heterocyclic groups, aryl groups, heteraryl groups, C1-C8 aldehyde groups, C2-C10 acyl groups, C2-C10 ester groups, amino groups, C1-C6 alkoxy groups, C1-C10 sulfonyl groups, etc.

In this invention, the term "1-6" refers to 1, 2, 3, 4, 5, 6. Other similar terms have similar meanings independently of each other. The term "multiple" refers to 2-6, such as 2, 3, 4, 5, 6.

The term "ester group" refers to the group with the following structure: —C(O)—O—R' or R'—C(O)—O—, where R' independently represents hydrogen, C1-C6 alkyl, C3-C6 cycloalkyl, C6-C10 aryl, heteraryl and heterocyclic, as defined above.

The term "ureido" refers to the group with the following structure:

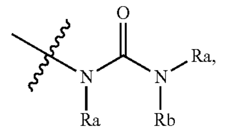

where Ra and Rb are independently selected from H, C1-C6 alkyl, halogenated C1-C6 alkyl and C6-C10 aryl groups. The term "urethane" refers to the groups with the following structures:

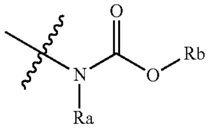 or 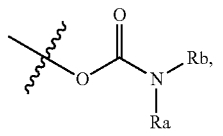

where Ra and Rb are independently selected from H, C1-C6 alkyl, halogenated C1-C6 alkyl and C6-C10 aryl groups.

The term "acylamino" refers to the group with the following structure: —CONRR', where R and R' could independently represent hydrogen, alkyl or substituted alkyl, cycloalkyl or substituted cycloalkyl, aryl or substituted aryl, heterocyclic or substituted heterocyclic rings, as defined above. R and R' can be the same or different in dialkyl amine fragments.

The term "carbonyl" has the following structure:

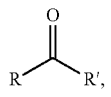

where R and R' could independently represent hydrogen, alkyl or substituted alkyl, cycloalkyl or substituted cycloalkyl, aryl or substituted aryl, heterocyclic or substituted heterocyclic rings, as defined above.

It should be noted that when a group exists at multiple locations in a compound at the same time, its definition at each location is independent of each other and can be the same or different. That is, the term "selected from the next group:" has the same meaning as the term "independently selected from the next group:".

As used herein, the term "composed of" or "comprise (include)" could be open, semi-closed and closed. In other word, the term described above includes "basically compose of" and/or "is consisting of".

Sequence-block binary copolymer and its preparation method This invention provides a sequence-block binary copolymer, wherein the main chain of the copolymer is consisting of sequence-block X, and the sequence-block X has a structure shown in formula (1):

$$-[(AAA)_m-(AB)_n]_p- \qquad (1)$$

wherein, (AAA) is a homopolymeric segment of monomer A, which is formed by the homopolymerization of three monomers A;

m is selected from the group consisting of 1, 2, 3, 4, 5, 6, 7, 8, 9, and 10;

(AB) is a copolymerized segment of monomer A and monomer B, which is formed by copolymerization of one monomer A and one monomer B;

n is selected from the group consisting of 1, 2, 3, 4, 5, 6, 7, 8, 9, and 10;

p is selected from the group consisting of 1, 2, 3, 4, 5, 6, 7, 8, 9, and 10.

The monomer A and the monomer B have the following characteristics: under polymerization conditions, the reaction activity of monomer A and that of monomer B are very different;

"the reaction activity of monomer A and that of monomer B are very different" means that monomer B is almost inactive, so it cannot be initiated to form a growth reactive species, and only a cyclic secondary monomer (AB) formed by monomer A and monomer B through cyclization reaction can enter the main chain of the copolymer; monomer A can be homopolymerized to form a homopolymeric segment (AAA) of monomer A to enter the main chain of the copolymer; then, (AAA) and (AB) together form the structure shown in formula (1).

Specially, under free radical polymerization conditions, the monomer A and the monomer B have the following characteristics:

The monomer B is selected from olefin, vinyl ether and maleic amide monomers and polymerized to form a structure selected from the group consisting of:

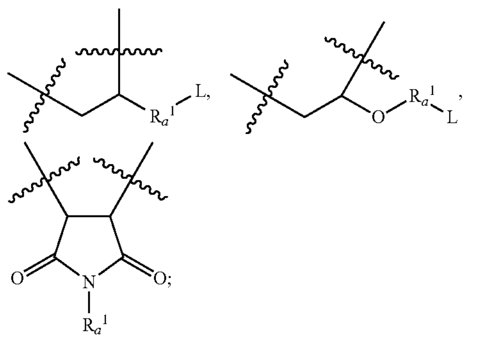

The monomer A is a polar monomer which shows huge different reactivity compared to monomer B. A is selected from methacrylate, acrylate and styrene monomers and polymerized to form a structure selected from the group consisting of:

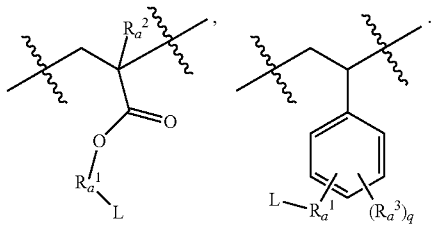

wherein, each $R_a^1$ is independently selected from the group consisting of C1-C6 alkylene, C3-C8 cycloalkylene, C5-C10 arylene, and -(C5-C10 arylene)-(C1-C6 alkylene)-;

each $R_a^2$ is independently selected from the group consisting of H, C1-C6 alkyl and halogenated C1-C6 alkyl;

each L is independently selected from the group consisting of —OH, —COOH, —$OCOR_1$, —$OR_1$, —$OSiR_1R_2$, —OZrR1$R_2$, —$OBR_1$, and $-L_1-L_2-R'$;

each $R_1$ and $R_2$ are independently selected from the group consisting of C1-C6 alkyl, C3-C8 cycloalkyl, C5-C10 aryl, and C5-C10 aryl-C1-C6 alkylene-;

each $-L_1-L_2-$ is independently selected from the group consisting of

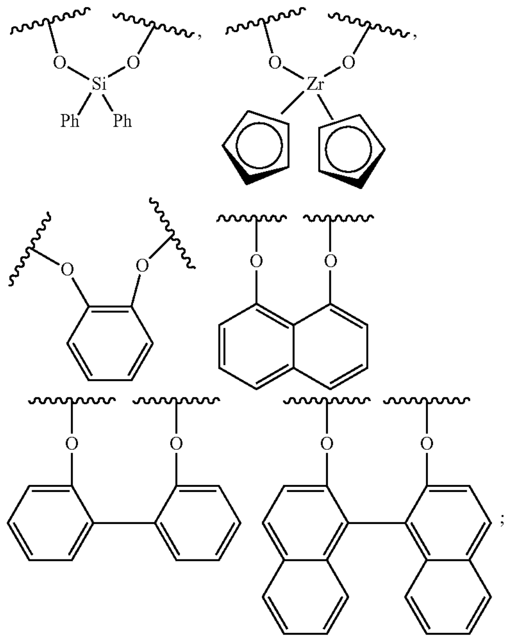

each R' is independently selected from the group consisting of C2-C6 alkenyl, —$R_a^1$—O—C2-C6 alkenyl, and

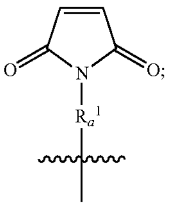

each $R_a^3$ is independently selected from the group consisting of H, halogenated or unsubstituted C1-C15 linear or branched alkyl, and substituted or unsubstituted C1-C15 linear or branched alkoxy; the substituted refers to being substituted by one or more substituents selected from the group consisting of halogen, hydroxyl, carbonyl, amino, and amide;

q is selected from the group consisting of 1, 2, 3, 4, and 5.

Specially, under free radical polymerization conditions, the monomer A and the monomer B have the following characteristics:

The monomer B is α-olefin monomer and polymerized to form a structure:

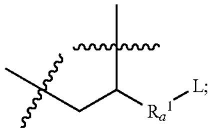

The monomer A is methacrylate monomer and polymerized to form a structure:

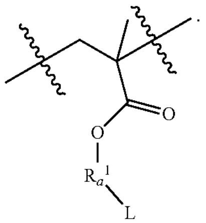

wherein, each $R_a^1$ is independently selected from the group consisting of C1-C6 alkylene, C3-C8 cycloalkylene, C5-C10 arylene, and -(C5-C10 arylene)-(C1-C6 alkylene)-;

each L is independently selected from the group consisting of —OH, —COOH, —$OCOR_1$, —$OR_1$, —$OSiR_1R_2$, —OZrR1$R_2$, —$OBR_1$, and $-L_1$-$L_2$-$R_a^1$—C═C;

each $R_1$ and $R_2$ are independently selected from the group consisting of C1-C6 alkyl, C3-C8 cycloalkyl, C5-C10 aryl, and C5-C10 aryl-C1-C6 alkylene-;

each $-L_1$-$L_2$– is independently selected from the group consisting of

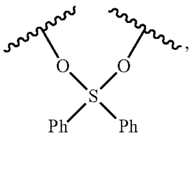,
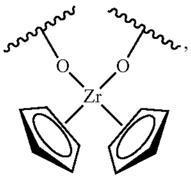,

-continued

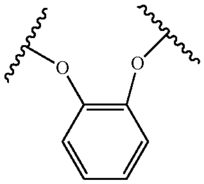
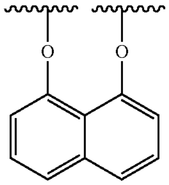
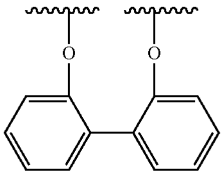
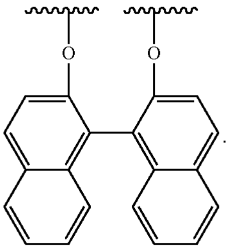.

This invention also provides a method for the preparation of the sequence-block binary copolymer:

By binding the two monomers together, monomer B could be inserted into the copolymer backbone via the cyclization reaction with A, while A could either intermolecularly propagate with another A to form homo-AAA sequence or intramolecularly cyclization with B to form alternating AB sequence. By controlling the monomer concentration, the probability of A-B cyclization could be well regulated, which resulted in polymethacrylate with olefin spacers, or rather, a sequence-block binary copolymer with partially alternating AB embedded in methacrylate backbone.

Take the comonomer pair methacrylate (monomer A) and olefin (monomer B) as an example:

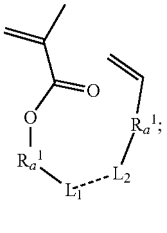

each $-L_1$-$L_2$– is independently selected from the group consisting of:

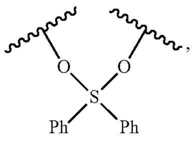,
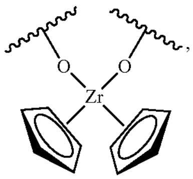,
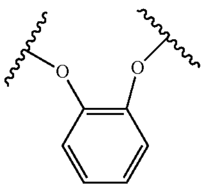
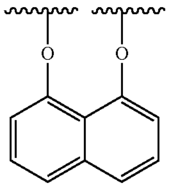

-continued

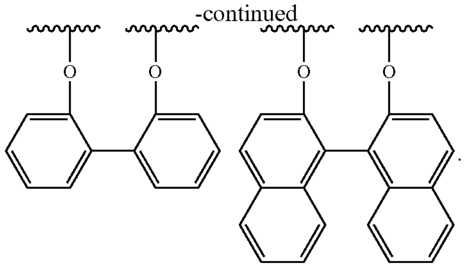

This invention also provides a method for the characterization of the sequence-block binary copolymer:

The specific monomer sequence and the content of each sequence in the copolymer backbone could be determined by $^{13}C$ NMR analysis.

A Fluorine-Containing Block Copolymer Material and its Preparation and Application Method This invention provides a highly ordered fluorine-containing polymer material, wherein the fluorine-containing polymer material comprises a block copolymer, and the block copolymer comprises the sequence-block X having a structure shown in formula (1) according to claim 1 and block Y;

Specially, the block Y has the following structure:

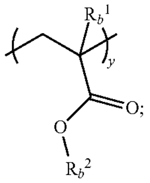

wherein, $R_b^1$ is selected from the group consisting of H, C1-C6 alkyl, and halogenated C1-C6 alkyl;

$R_b^2$ is a fluorine-containing group;

y is selected from the group consisting of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

The X block of the block copolymer corresponds to the sequence-block copolymer described above, in which the isolated B unit separated by A units merely acted as a carbon-carbon spacer, which did not show additional repelling force with the fluorinated Y block nor generate additional morphology or nano domain but broke the AAA homopolymer backbone to achieve smaller domain size.

Sequence-Block Terpolymer and its Preparation Method

This invention A sequence-block terpolymer, wherein the sequence-block terpolymer is formed by copolymerization of monomer A, monomer B and monomer C. The monomer C is non-homopolymerizable due to Steric hindrance or low reactivity, and thus could only be copolymerized with monomer A to be incorporated into the homo-AAA segment. Moreover, the incorporation of C would not influence the cyclization reaction of monomer B.

the sequence-block terpolymer has a structure shown in formula (2):

$$-[(AC)_k-(AA)_m-(AB)_n]_p- \quad (2)$$

wherein, (AC) is a copolymerized segment of monomer A and monomer C, which is formed by copolymerization of one monomer A and one monomer C;

k is selected from the group consisting of 1, 2, 3, 4, 5, 6, 7, 8, 9, and 10;

(AA) is a homopolymeric segment of monomer A, which is formed by the homopolymerization of two monomers A;

m is selected from the group consisting of 1, 2, 3, 4, 5, 6, 7, 8, 9, and 10;

(AB) is a copolymerized segment of monomer A and monomer B, which is formed by copolymerization of one monomer A and one monomer B;

n is selected from the group consisting of 1, 2, 3, 4, 5, 6, 7, 8, 9, and 10;

p is selected from the group consisting of 1, 2, 3, 4, 5, 6, 7, 8, 9, and 10.

Specially, the monomer C is selected from:

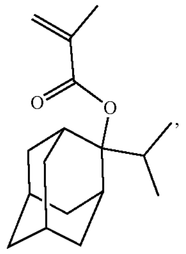, 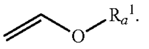

wherein, each $R_a^1$ is independently selected from the group consisting of hydrogen, C1-C6 alkylene, C3-C8 cycloalkylene, C5-C10 arylene, and -(C5-C10 arylene)-(C1-C6 alkylene)-;

The advantages of this invention compared with the existing technologies are:

(1) This invention provides a type of brand-new sequence-block copolymers. The described sequence-block binary and ternary copolymers contain well-controlled and precise monomer sequence;

(2) The described sequence-block copolymers are easily prepared. Specifically, such sequence-block copolymers were polymerized from the comonomer pair (monomer A and monomer B) with hugely different reactivities. Under the polymerization condition, monomer B is inert and could not generate any stable growing species from B. By binding the two monomers together, B could only be inserted into backbone via the cyclization reaction with A, while A could either intermolecularly propagate with another A to form homo-AAA sequence or intramolecularly cyclization with B to form alternating AB sequence. By controlling the monomer concentration, the probability of A-B cyclization (the DP of each sequence block) could be well regulated, which resulted in polymethacrylate with olefin spacers, or rather, a sequence-block binary copolymer with partially alternating AB embedded in methacrylate backbone. By further incorporating a non-homopolymerizable third monomer C, a sequence-block terpolymer was prepared. The incorporation of C would not influence the cyclization reaction of olefin, and C could only be copolymerized with methacrylate and thus be incorporated into the homo-methacrylate segment.

(3) A new family of block copolymer (BCP) material was precisely synthesized by growing the sequence-block copolymer from a fluorine-containing macroinitiator. Although one of the blocks was composed of two components (monomer A and monomer B), such a BCP could self-assemble into single lamellar morphology with sub-6 nm domain size. This is because that the isolated B unit sandwiched by A units merely acted as a carbon-carbon spacer, which did not generate additional morphology or nano domain but broke the AAA homopolymer backbone to achieve smaller domain size. The spacer B unit could be further functionalized to afford functionalized BCP patterning material without changing the self-assembly behavior.

In order to explain the technical content, purpose and effect of the invention in detail, the following embodiments are given in combination with instructions and attached figures. It should be noted that these embodiments are only intended to illustrate but not to limit the scope of the invention. If the experimental methods in the following embodiments were not specially noted, then follow the conventional conditions or as recommended by the vendors. Percentage and fraction are calculated by weight unless otherwise stated.

Unless otherwise defined, all professional and scientific terms used herein have the same meaning as those familiar to those skilled in the field. In addition, any method or material similar or same to the content recorded may be applied to the method of the invention. The better implementation methods and materials described in this invention are for demonstration purposes only.

Embodiment 1: Synthesis of Sequence-Block Copolymer P1 by Free Radical Polymerization In a reaction tube, 0.38 g monomer M1 and 6.6 mg azodiisobutyronitrile (AIBN) were dissolved in 2 mL of N, N-dimethylformamide (DMF) under nitrogen atmosphere. The solution was degassed via three freeze-pump-thaw cycles and stirred at 60-90° C. for 8 h. The reaction was quenched by rapid cooling with liquid nitrogen, and the resulting polymer was precipitated into methanol, collected through centrifugation and dried in vacuo for 24 h at 40° C. 0.3 g polymer was obtained. The molecular weight of polymer measured by GPC was $3.5\times10^4$, the molecular weight distribution (PDI) was 6.39. The conversion of methacrylate and olefin carbon-carbon double bond at 8 h was 96% and 16%, respectively, indicating that the olefin monomer participated in the cyclization reaction under this condition.

The structures of the monomer M1 is as follow:

M1

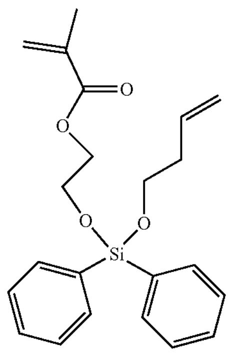

FIG. 1 shows the $^1$H NMR spectrum of the sequence-block binary copolymer P1 obtained in Embodiment 1. The peaks at 5.76 and 4.99 ppm correspond to the hydrogen atoms (3H) of the unreacted olefin carbon-carbon double bonds. The peaks at 4.65~3.12 ppm are assigned to the hydrogen atoms (6H) of the methylene bonded to the silicon ether (Si—O), indicating that the copolymer backbone is composed of the methacrylate-olefin in 12-membered ring and the methacrylate units attached with the unreacted olefin double bonds. According to the proportion of the integral of the characteristic peaks from the unreacted side-chain olefin (e) and main-chain 12-membered ring (a +b+c), it can be calculated that the cyclization of P1 is 100%−78% =22%, in other words, 22% of the total olefin is incorporated into the copolymer backbone.

The silane bridge was removed by hydrolysis in trifluoroacetic acid (TFA). Polymers (0.25 g) were dissolved in 15 mL of DCM in a round-bottom flask under $N_2$ atmosphere. To this resultant solution, TFA (0.35 mL) was added dropwise at 0° C. in 30 min and stirred for 6 h. The solvent was removed under reduced pressure at 40° C., and the precipitate was collected and redissolved in tetrahydrofuran and then added dropwise to hexane. The products were collected by centrifugation and dried under vacuum for 24 h at 40° C. to afford hydrolyzed polyols as light-brown powders.

Figure 2:
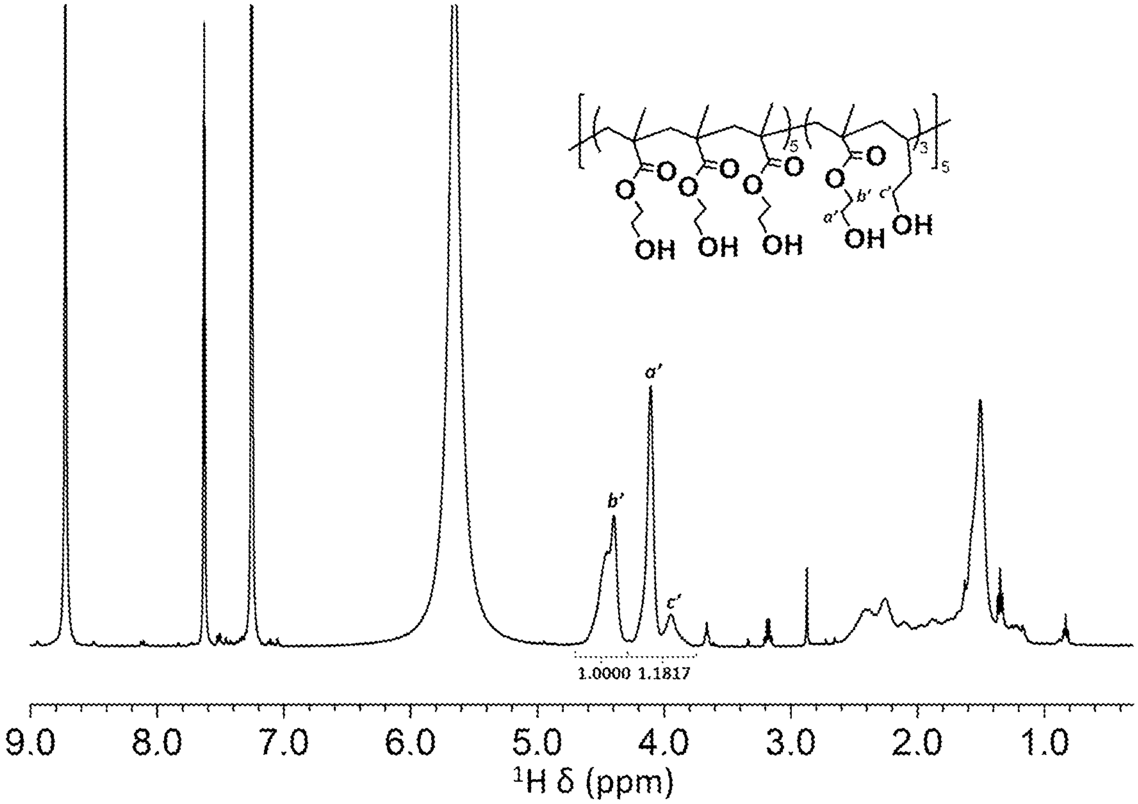
FIG. 2 shows the $^1$H NMR spectrum of the deprotected product P1' from P1 obtained in Embodiment 1.
Figure 3:
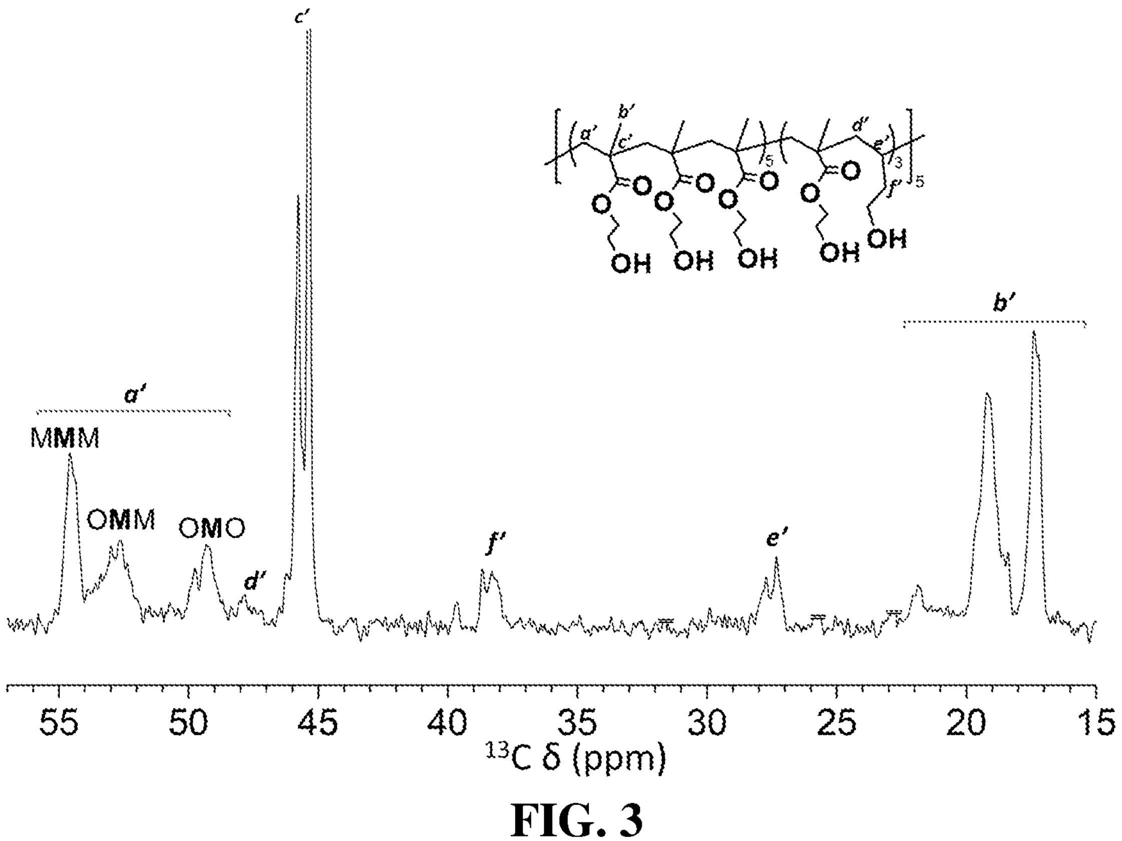
FIG. 3 shows the $^{13}$C NMR spectrum of the deprotected product P1' from P1 obtained in Embodiment 1.

FIG. 2 shows the $^1$H NMR spectrum of the deprotected product P1' from P1 obtained in Embodiment 1. The peak at 3.94 ppm corresponds to the hydrogen atoms (2H) of the hydroxymethyl in butanol, while the peaks at 4.8-4.28 ppm and 4.1 ppm are assigned to the hydrogen atoms (4H) of the hydroxymethyl in butanol in HEMA. According to the proportion of the integral of the characteristic peaks from butanol (a'+c'−b') and HEMA (b'), it can be calculated that the compositional ratio of HEMA/butanol in P1' is 0.1817/1.1817=85/15, in other words, the mole ratio of methacrylate/olefin in the P1 backbone is 85/15. FIG. 3 shows the $^{13}$C NMR spectrum of the deprotected product P1' from P1 obtained in Embodiment 1. The peaks at 55~49 ppm correspond to the carbon atoms of the backbone methylene of HEMA. When olefin inserted, the singular peak at 54.6 ppm splits into two new peaks around 52.9 and 49.3 ppm, which could be assigned as MMM, OMM and OMO sequence, respectively. Peaks of OMM (52.9 ppm) and OMO (49.3 ppm) were separated completely with similar intensity, giving [OMM]=[OMO], indicating MM-MOMOMOM-MM structure, or ---$(OM)_3$----. According to the molecular weight measured by GPC and the mole ratio of methacrylate/olefin quantified by $^1$H NMR, P1 is expressed by the following formula:

$$[(MMM)_5-(MO)_3]_5$$

The structures of the sequence-block copolymers P1 and P1' are as follows:

P1

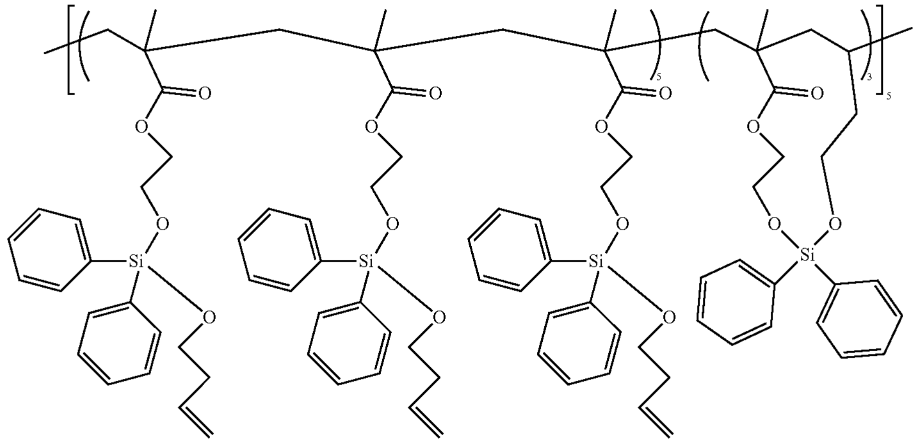

P1'

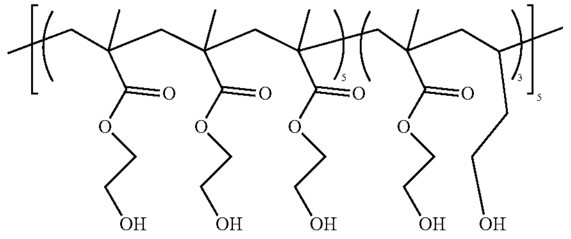

Specially, the sequence-block copolymers P1 and P1' described above are corresponding to the formula 1 in this invention, where m=5, n=3, p=5.

Figure 4:
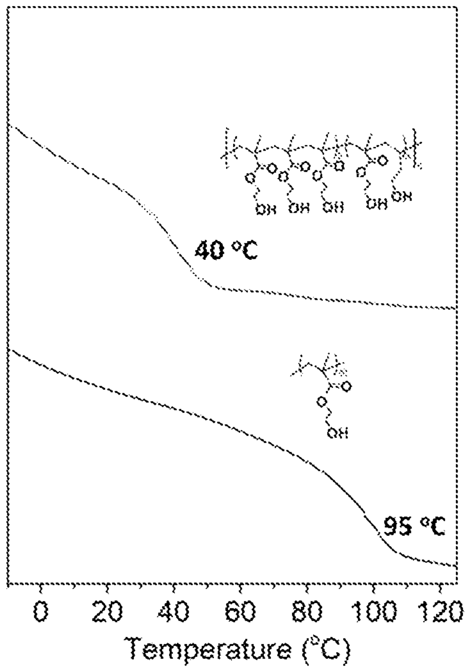
FIG. 4 shows the DSC curves of the deprotected product P1' from P1 obtained in Embodiment 1 compared to PHEMA.

FIG. 4 shows the DSC curves of the deprotected product P1' from P1 obtained in Embodiment 1 compared to PHEMA, which exhibited a singular glass transition temperature ($T_g$) of 40° C. well below 95° C. of PHEMA, indicating the huge influence of highly ordered sequence on the polymer properties.

Embodiment 2: Synthesis of Block Copolymer B1 Composed of One Fluorinated Block and One Sequence-Block Copolymer Block by Reversible Addition-Fragmentation Chain Transfer (RAFT) Polymerization 4 g of heptafluorobutyl methacrylate (HFBMA, M2, 15 mmol), 0.55 g of RAFT agent 2-cyano-2-propyl benzodithioate (CPDB, 2.5 mmol) and 0.04 g of AIBN (0.25 mmol) were dissolved in 1,1,1,3,3,3-hexafluoro-2-propanol (HFIP) in a two-neck flask equipped with a magnetic stirring bar under $N_2$ atmosphere. The solution was deoxygenated via three freeze-pump-thaw cycles, and then the flask was immersed into preheated oil bath at 60-90° C. for 12 h. The crude product was purified by reprecipitation from methanol twice, dried in vacuo for 24 h at 40° C. to yield PHFBMA macroinitiator as a pink powder (1.5 g, 38%). The molecular weight of polymer measured by $^1$H NMR was $6.1\times10^3$, the molecular weight distribution (PDI) measured by GPC was 1.07. The degree of polymerization (DP) of the macroinitiator PHEMA was 22.

The structures of the fluorinated monomer M2 and macroinitiator I are as follows:

fluorinated monomer M2

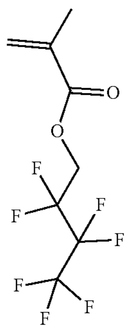

macroinitiator I

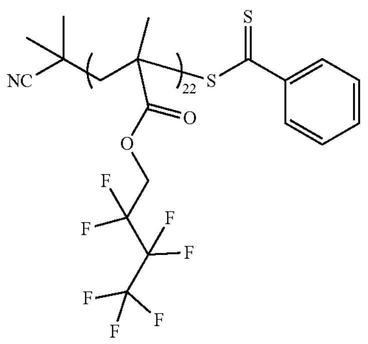

Afterwards, 0.76 g of monomer M1 (2 mmol), 0.81 g of macroinitiator PHFBMA (0.13 mmol) and AIBN (1.6 mg, 0.01 mmol) were dissolved in tetrahydrofuran at desired monomer concentrations (0.2-0.3 M) in a two-neck flask. The mixture was degassed via three freeze-pump-thaw cycles and heated in a thermostated oil bath at 70~90° C. The reaction was terminated in liquid nitrogen at the predetermined time, and the resulting polymer was reprecipitated from methanol twice, dried in vacuo for 24 h at 40° C. to yield the block copolymer as a light-pink powder (0.5 g, 32%). The molecular weight of polymer measured by $^1$H NMR was $1.1\times10^4$, the molecular weight distribution (PDI) measured by GPC was 1.15.

Figure 5:
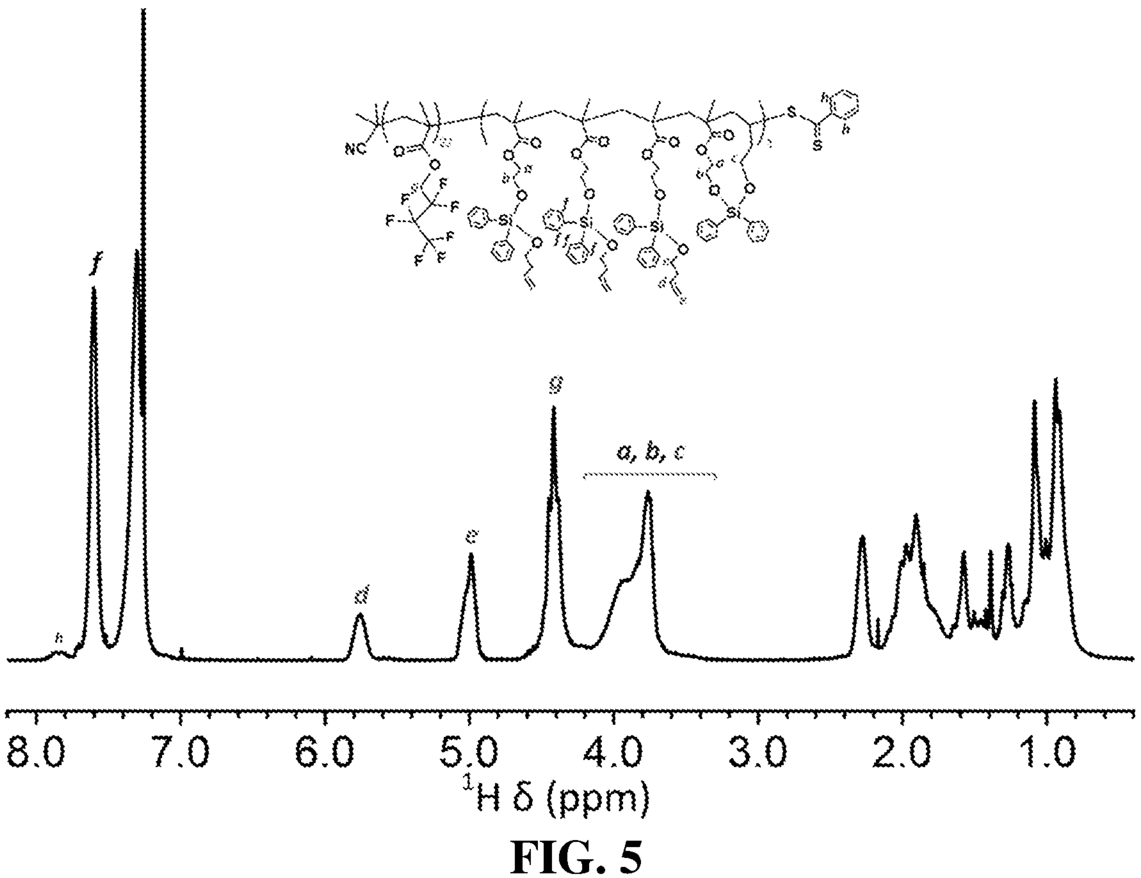
FIG. 5 shows the $^1$H NMR spectrum of the block copolymer B1 obtained in Embodiment 2.

FIG. 5 shows the $^1$H NMR spectrum of the block copolymer B1 obtained in Embodiment 2. The peaks at 5.76 and 4.99 ppm correspond to the hydrogen atoms (3H) of the unreacted olefin carbon-carbon double bonds from M1. The peaks at 4.5-3.1 ppm are assigned to the hydrogen atoms (6H) of the methylene bonded to the silicon ether (Si—O) in M1 while the peak at 4.42 ppm corresponds to the hydrogen atoms (2H) of the methylene bonded to the ester group in M2, indicating that the block copolymer B1 is composed of one fluorinated block and one sequence-block copolymer block.

According to the proportion of the integral of the characteristic peaks from the methylene in M2 (g) and M1 (a +b+c), it can be calculated that the DP of the sequence-block copolymer block is 12, the cyclization in which was further determined as 25%, in other words, the mole ratio of methacrylate/olefin in the B1 backbone is 80/20, or rather, methacrylate=12, olefin=3. As a result, the sequence-block copolymer block in B1 is expressed by the following formula:

$$[(MMM)\text{-}(MO)]_3$$

The structure of the block copolymer B1 composed of one fluorinated block and one sequence-block copolymer block is as follow:

B1

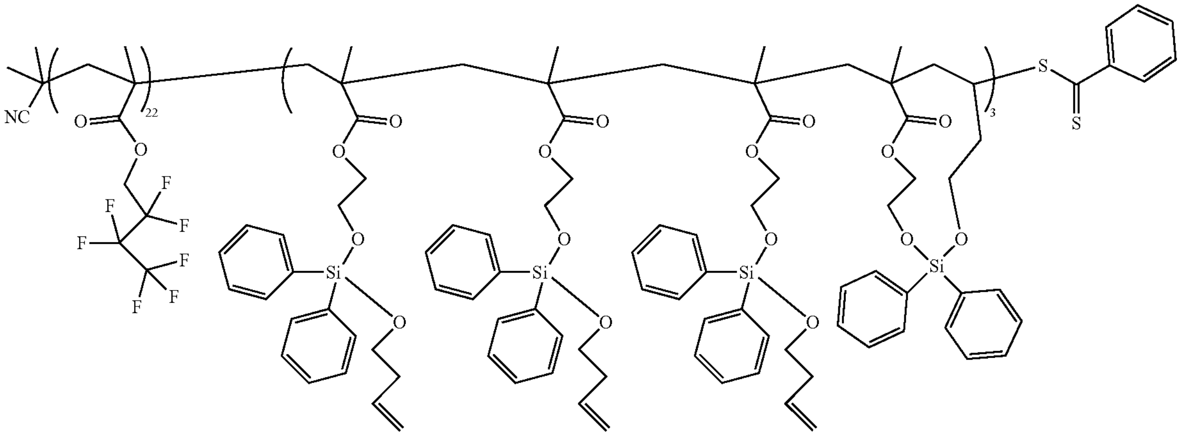

Specially, the sequence-block binary copolymer block described above is corresponding to the formula 1 in this invention, where m=1, n=1, p=3.

Figure 6:
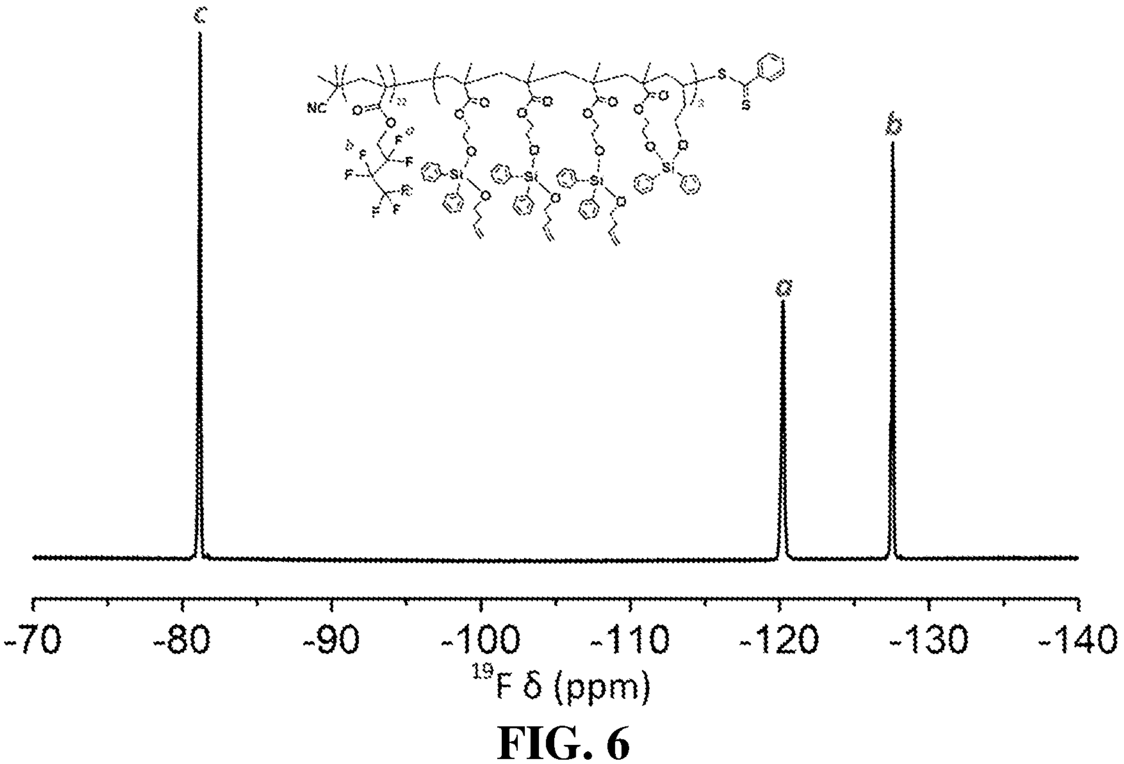
FIG. 6 shows the $^{19}$F NMR spectrum of the block copolymer B1 obtained in Embodiment 2.

FIG. 6 shows the $^{19}$F NMR spectrum of the block copolymer B1 obtained in Embodiment 2. There peaks at -81.2 (c), -120.3 (a) and -127.6 (b) ppm correspond to the fluorine atoms of HFBMA within three different chemical environments, confirming that B1 is composed of one fluorinated block and one sequence-block copolymer block.

0.1 g of the block copolymer B1 was dissolved in tetrahydrofuran form a solution with the polymer concentration of 10 wt %, followed by spin-coated onto a silicon wafer. After the complete evaporation of tetrahydrofuran, the samples were annealed at 160° C. under $N_2$ atmosphere for 24 h on a hot plate. The powders were collected and characterized by SAXS.

Figure 7:
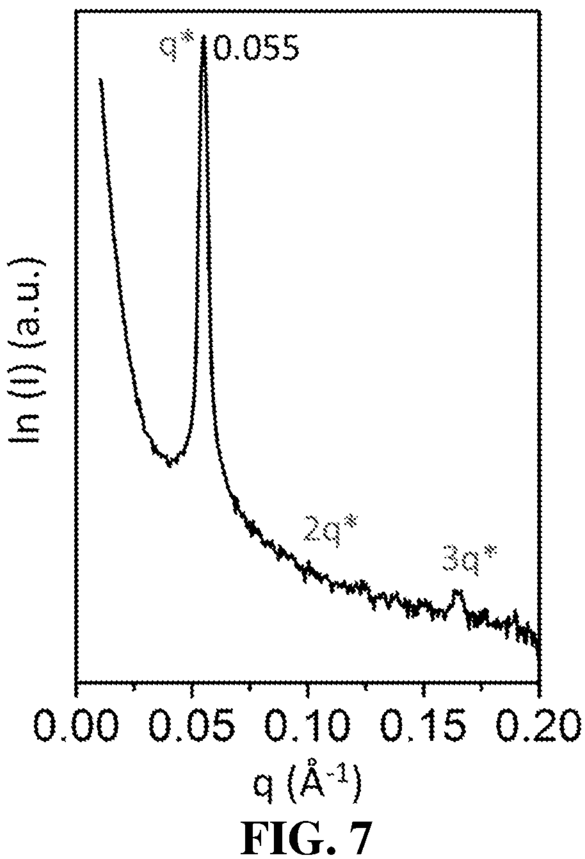
FIG. 7 shows the SAXS profile of the block copolymer B1 obtained in Embodiment 2 after 20 24 h annealing at 160° C.

FIG. 7 shows the SAXS profile of the block copolymer B1 obtained in Embodiment 2 after 24 h annealing at 160° C. Three sharp scattering peaks were observed in the ratio of 1:2:3, indicating the lamellar morphology. d-spacing was calculated by the equation as $d=2\pi/q^*$, where $q^*$ was the value of the first order peak in SAXS. d=27/0.55=11.4 nm.

The isolated olefin unit sandwiched by methacrylate units in the sequence-block copolymer block merely acted as a carbon-carbon spacer, which did not generate additional morphology or nano domain but broke the polymethacrylate backbone to achieve smaller domain size. The interaction between the fluorinated methacrylate block and the methacrylate silane segment drove phase separation, forming single lamellar morphology with 5.7 nm uniform domain size.

Embodiment 3: Synthesis of Sequence-Block Terpolymer P2 by Free Radical Polymerization In a reaction tube, monomer M1, M3 with a very bulky side group and initiator AIBN were dissolved in 10 mL of N, N-dimethylformamide (DMF) at the mole ratio of 25:25:1 under nitrogen atmosphere. The solution was degassed via three freeze-pump-thaw cycles and stirred at 60-90° C. for 24 h. The reaction was quenched by rapid cooling with liquid nitrogen, and the resulting polymer was precipitated into methanol, collected through centrifugation and dried in vacuo for 24 h at 40° C. to yield a white powder. The molecular weight of polymer measured by GPC was $7.5\times10^3$, molecular weight distribution (PDI) was 1.43. The structures of the third monomer M3 is as follow:

third monomer M3

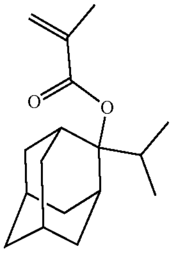

Figure 8:
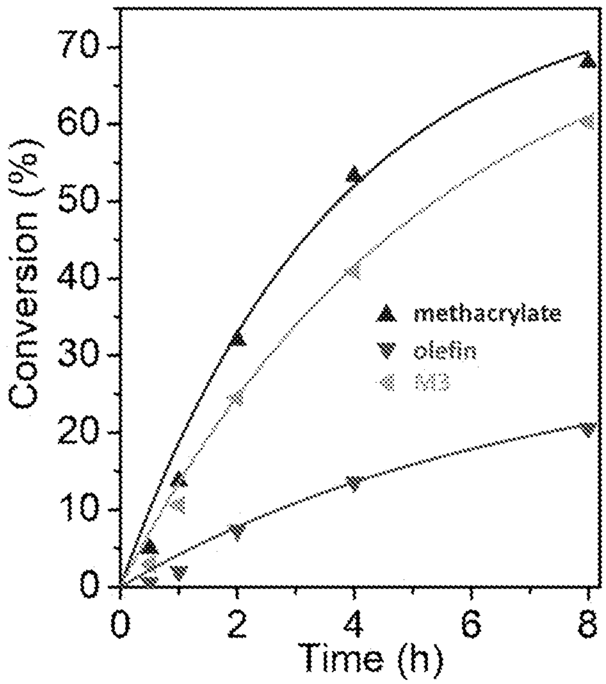
FIG. 8 shows the conversion rates of the three types of carbon-carbon double bonds at different polymerization times in Embodiment 3.

FIG. 8 shows the conversion rates of the three types of carbon-carbon double bonds along with polymerization time in Embodiment 3. It can be seen from FIG. 8 that the three types of double bonds are consumed simultaneously at different polymerization times.

Figure 9:
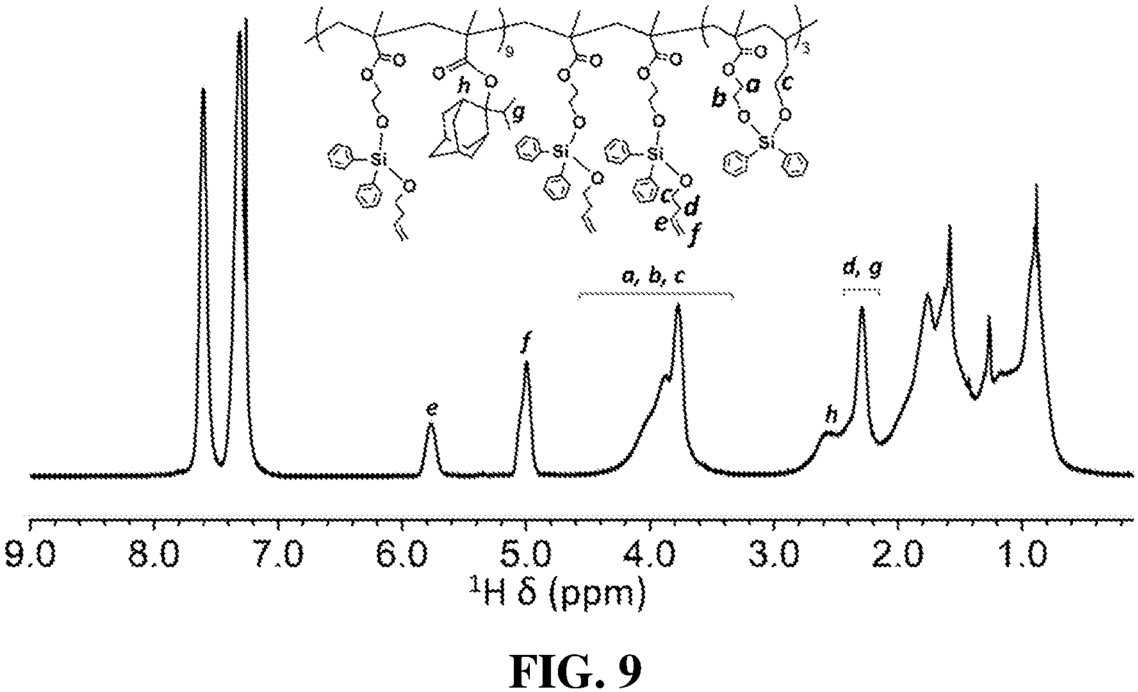
FIG. 9 shows the $^1$H NMR spectrum of the sequence-block terpolymer P2 obtained in Embodiment 3.

FIG. 9 shows the $^{1}$H NMR spectrum of the sequence-block terpolymer P2 obtained in Embodiment 3. The peaks at 5.76 and 4.99 ppm correspond to the hydrogen atoms of unreacted carbon-carbon double bonds of olefin on the side chain, and the peaks at 4.65-3.12 ppm are assigned to the hydrogen atoms (6H) of methylene bonded to the oxygen atoms from M1. The peaks at 2.60 and 2.28 ppm are from the adamantanyl group (2H) and isopropyl group (1H) in M1, respectively, indicating that both M1 and M3 are incorporated into the copolymer backbone. The cyclization of the terpolymer P2 was determined as 22%, in other words, the mole ratio of methacrylate/olefin in the P2 backbone is 82/18.

Figure 10:
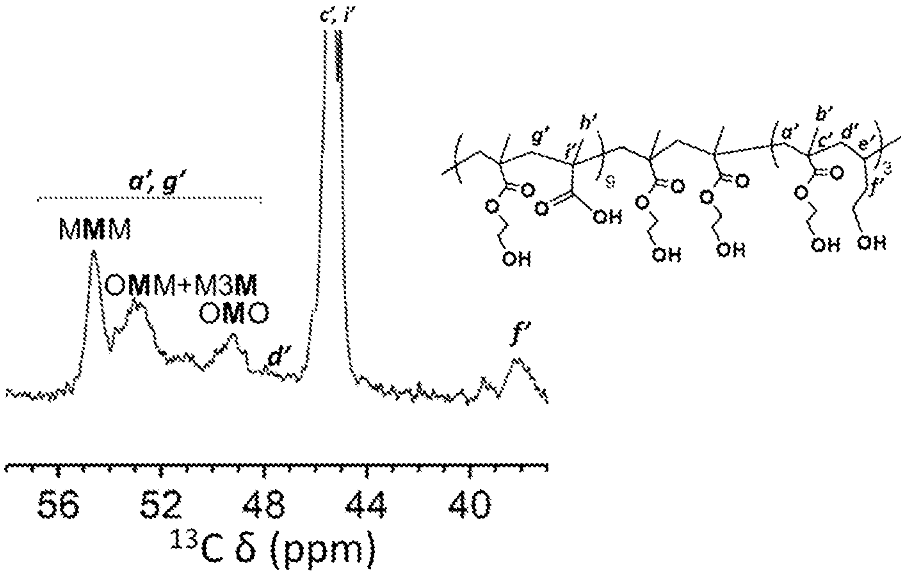
FIG. 10 shows the $^{13}$C NMR spectrum of the deprotected product P2' from P2 obtained in Embodiment 3.

FIG. 10 shows the $^{13}$C NMR spectrum of the deprotected product P2' from P2 obtained in Embodiment 3. Compared to the $^{13}$ C NMR spectrum of P1' shown in FIG. 3, there is almost no change in the peaks related to olefin, indicating that the incorporation of M3 would not influence the cyclization reaction of olefin, and the final cyclization (%) in P2 keeps the same with that in P1. The non-homopolymerizable M3 could only be copolymerized with methacrylate and thus be incorporated into the homo-methacrylate segment.

According to the proportion of the integral of the characteristic peaks from monomer M1 (a +b+c) and M3 (g+h), it can be calculated the mole ratio of M1/M3 in the P2 backbone is 61/39, in other words, the M1 content is 39 mol %. Furthermore, according to the molecular weight of P2, it can be calculated on average M1=14, M3=9 per polymer chain. P2 is expressed by the following formula:

$(MM3)_9$-MM-$(MO)_3$

The structure of the sequence-block terpolymer P2 is as follow:

2. Gel Permeation Chromatography (GPC)

In this invention, the number-average molecular weight (M.) and polydispersity index (PDI) can be characterized by gel permeation chromatography in tetrahydrofuran against PS standards with a differential refractive detector.

3. Differential Scanning Calorimetry (DSC)

In this invention, a differential scanning calorimeter (TA, Q2000) was used to perform thermal analysis. The thermal history of the polymer was first eliminated by a a heating-cooling cycle at a rate of 20° C. min$^{31\ 1}$. The second thermal cycle was conducted at a rate of 10° C. min-$^{1}$, and the glass transition temperature of the polymer was determined according to the second heating curve.

4. Small-Angle X-ray Scattering (SAXS)

In this invention, a small angle X-ray diffractometer (Xenocs, Xeuss 2.0) was used to characterize the morphology and domain size of the block copolymer under vacuum conditions at room temperature. The sample powder after thermal annealing was filled into a metal hole and then sealed on both sides using thin Kapton films.

All the raw materials involved in the embodiments of this invention are commercially available.

All literatures mentioned in the present invention are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. An ordered fluorine-containing polymer material, wherein the fluorine-containing polymer material comprises a block copolymer, and the block copolymer comprises the sequence-block X and block Y;

P2

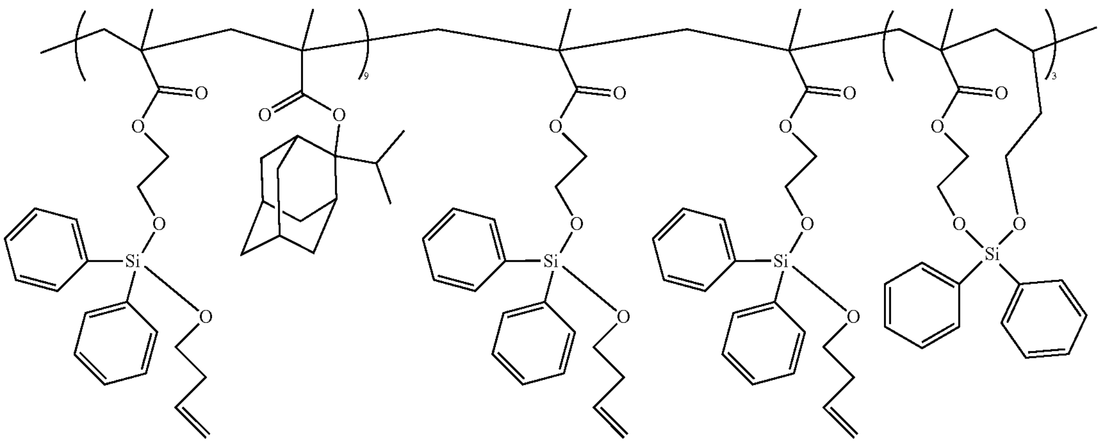

Specially, the sequence-block terpolymers P2 described above is corresponding to the formula 2 in this invention, where m=1, n=3, k=9, p=1.

The characterizations and the parameter information of the instruments used in this invention are as follows:

1. Nuclear Magnetic Resonance Spectroscopy (NMR)

In this invention, 400 MHz Nuclear Magnetic Resonance spectrometer (Brucker, AVANCE III) was used to determine the specific structure of the copolymer, chloroform-d was used as the solvent, and the incorporation of each component in the copolymer is determined by calculating the integral of the characteristic peaks of hydrogen atoms.

the block Y has the following structure:

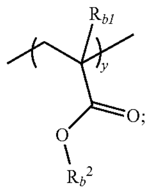

wherein, $R_b^1$ is selected from the group consisting of H, and C1 alkyl;

$R_b^2$ is a fluorine-containing group;

y is selected from the group consisting of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50;

and the sequence-block X has a structure shown in formula (1):

$$-[(AAA)_m-(AB)_n]_p- \quad (1)$$

wherein, (AAA) is a homopolymeric segment of monomer A, which is formed by the homopolymerization of three monomers A; wherein, monomer A is a methacrylate monomer or an acrylate monomer, and polymerized to form a structure of

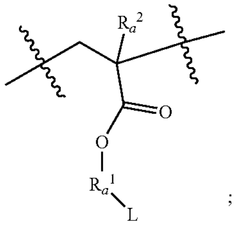

;

each $R_a^1$ is independently C1-C6 alkylene;

each $R_a^2$ is independently selected from the group consisting of H, and C1 alkyl;

each L is independently selected from —OH, and —$L_1$-$L_2$-R'; each R'is independently selected from the group consisting of C2-C6 alkenyl; each —$L_1$-$L_2$— is independently selected from the group consisting of

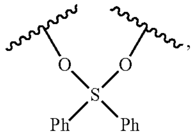

,

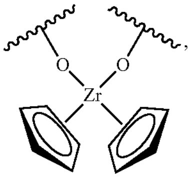

,

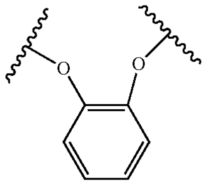

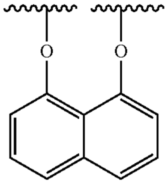

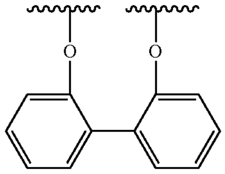

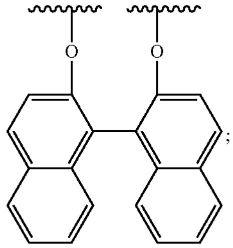

;

and m is selected from the group consisting of 1, 2, 3, 4, 5, 6, 7, 8, 9, and 10;

(AB) is a copolymerized segment of monomer A and monomer B, which is formed by copolymerization of one monomer A and one monomer B; the monomer B is an olefin monomer; and (AB) is a cyclic structure of

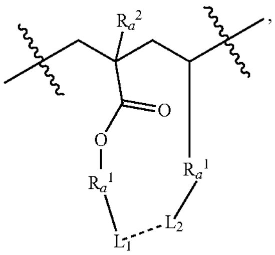

, or in (AB), the cyclic structure of

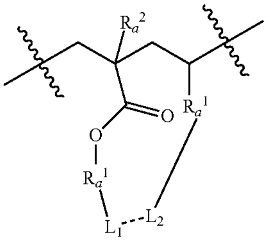

hydrolyzes to form two structures of

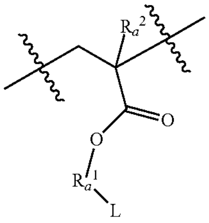

, and

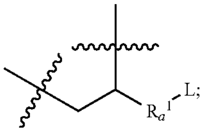

;

wherein, each $R_a^1$ is independently C1-C6 alkylene;

each $R_a^2$ is independently selected from the group consisting of H, and C1 alkyl; each —$L_1$-$L_2$— is independently selected from the group consisting of

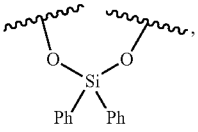

,

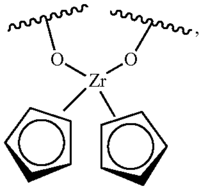

,

-continued

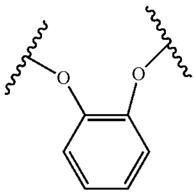 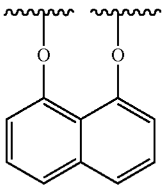

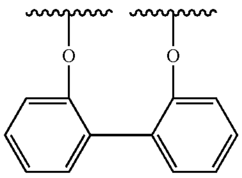

and

-continued

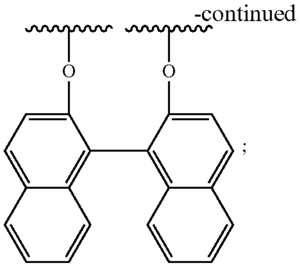

;

each L is independently —OH;

and n is selected from the group consisting of 1, 2, 3, 4, 5, 6, 7, 8, 9, and 10;

p is selected from the group consisting of 1, 2, 3, 4, 5, 6, 7, 8, 9, and 10.

2. The ordered fluorine-containing polymer material according to claim 1, wherein $R_b^2$ is F-substituted C1-C10 alkyl.

3. The ordered fluorine-containing polymer material of claim 1, wherein the block copolymer has the following structure:

B1

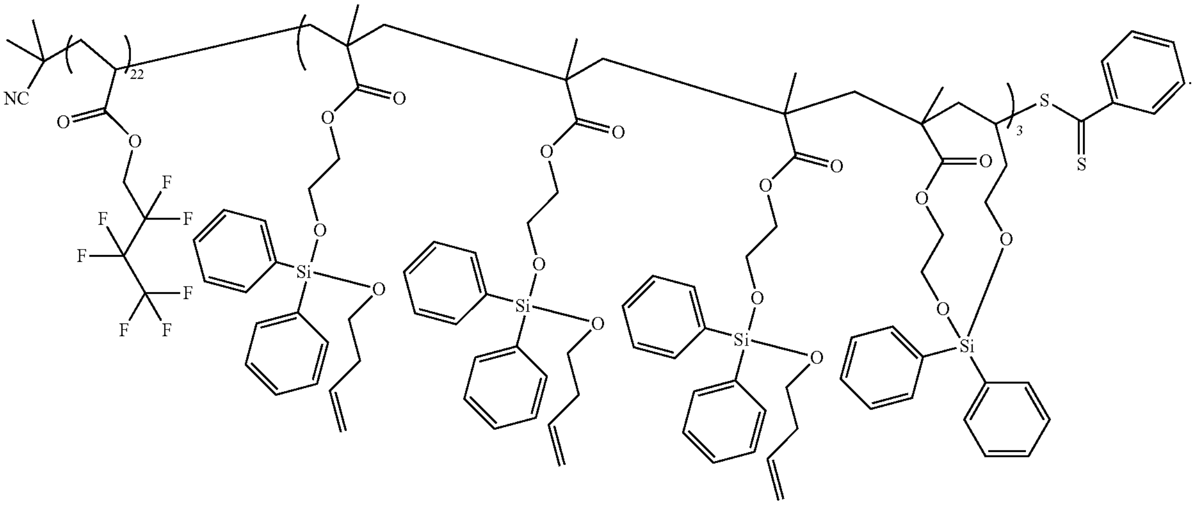

4. A lithographic material, wherein the lithographic material comprises the ordered fluorine-containing polymer material of claim 1.

* * * * *